United States Patent
Terazono et al.

(10) Patent No.: US 8,866,820 B2
(45) Date of Patent: Oct. 21, 2014

(54) OUTLINE FONT COMPRESSION METHOD AND OUTLINE FONT DECOMPRESSION METHOD

(75) Inventors: Kohei Terazono, Kawasaki (JP);
Yoshiyuki Okada, Kawasaki (JP);
Masashi Takechi, Hyogo (JP)

(73) Assignee: Fujitsu Limited, Kawasaki (JP)

( * ) Notice: Subject to any disclaimer, the term of this patent is extended or adjusted under 35 U.S.C. 154(b) by 2004 days.

(21) Appl. No.: 11/680,314

(22) Filed: Feb. 28, 2007

(65) Prior Publication Data

US 2007/0216690 A1 Sep. 20, 2007

(30) Foreign Application Priority Data

Mar. 15, 2006 (JP) .................................. 2006-071799

(51) Int. Cl.
| G06T 11/00 | (2006.01) |
| G09G 5/24 | (2006.01) |
| G06T 9/00 | (2006.01) |
| G06T 11/20 | (2006.01) |

(52) U.S. Cl.
CPC ............... G06T 9/005 (2013.01); G06T 11/203 (2013.01); *G09G 5/24* (2013.01)
USPC ........ 345/467; 345/468; 345/469; 345/469.1; 382/197; 382/198; 382/253

(58) Field of Classification Search
CPC ......... G06T 11/203; G06T 9/005; G09G 5/24
USPC .......................... 345/467–469.1; 382/197, 253
See application file for complete search history.

(56) References Cited

U.S. PATENT DOCUMENTS

| 3,471,848 | A | * | 10/1969 | Manber ............................ 345/10 |
| 3,636,329 | A | * | 1/1972 | De Sipio et al. ................ 341/99 |
| 3,707,680 | A | * | 12/1972 | Gabbard et al. ............... 375/246 |
| 4,029,947 | A | * | 6/1977 | Evans et al. .................... 345/472 |
| 4,331,955 | A | * | 5/1982 | Hansen .......................... 345/611 |
| 4,597,101 | A | * | 6/1986 | Kishimoto et al. ............ 382/253 |
| 5,757,961 | A | * | 5/1998 | Yamakawa et al. ........... 382/197 |
| 5,982,387 | A | * | 11/1999 | Hellmann ...................... 345/469 |
| 5,995,118 | A | * | 11/1999 | Masuda ......................... 345/467 |
| 6,992,671 | B1 | * | 1/2006 | Corona .......................... 345/467 |
| 2004/0233197 | A1 | * | 11/2004 | Liu et al. ........................ 345/442 |
| 2007/0070071 | A1 | * | 3/2007 | Terazono et al. ............. 345/467 |

FOREIGN PATENT DOCUMENTS

| JP | 5-94526 | 4/1993 |
| JP | 5-143048 | 6/1993 |

* cited by examiner

*Primary Examiner* — Jin-Cheng Wang
(74) *Attorney, Agent, or Firm* — Fujitsu Patent Center

(57) ABSTRACT

A difference of coordinate values stored adjacent to each other is compressed by means of a statistical coding system when reading out outline font data storing coordinate values necessary for drawing a contour of a character in order of drawing the contour in a clockwise or counterclockwise direction and also a category of a line connecting a pair of coordinates simultaneously, followed by compressing the coordinate values of the outline font data. A value of a result of subtracting "A−1" from a difference of coordinate values is determined to be a difference value of coordinates if the difference of coordinate value is equal to or greater than a certain value A, and a code expressing the difference value of "0" is added in front of the codes of difference values that are smaller than the value A in the case of a category of line connecting adjacent coordinates to each other being a straight line.

8 Claims, 28 Drawing Sheets

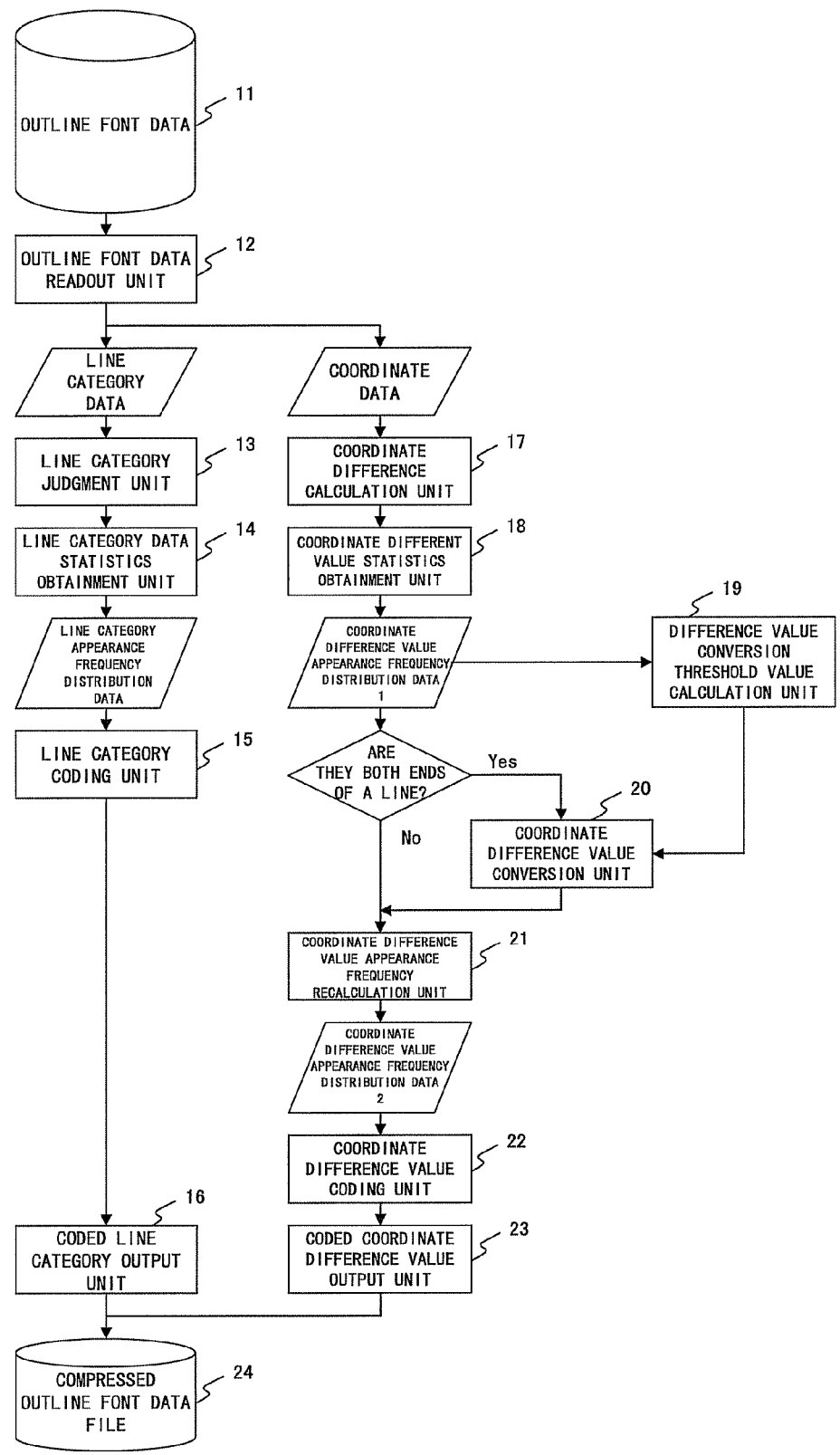
F I G. 3

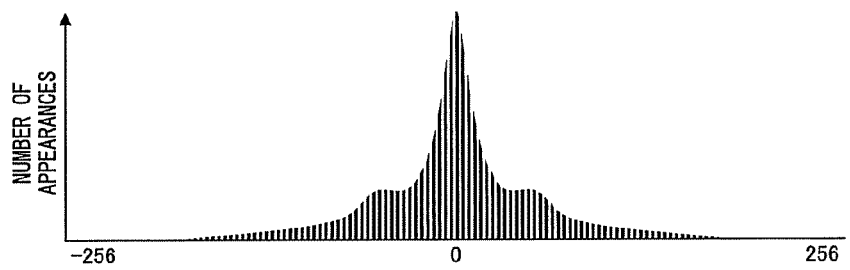

(A) DIFFERENCE VALUE APPEARANCE FREQUENCY
DISTRIBUTION CONSTITUTING A CURVE

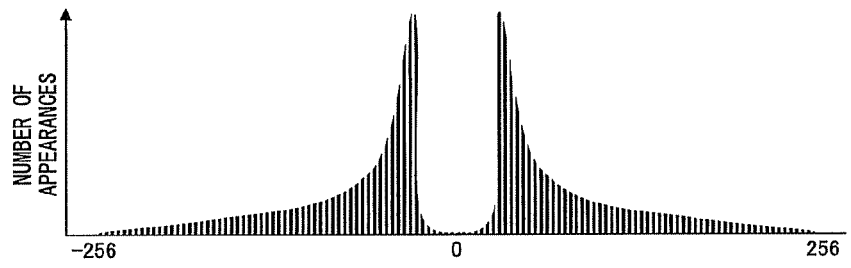

(B) DIFFERENCE VALUE APPEARANCE FREQUENCY DISTRIBUTION
OF BOTH ENDS COORDINATES OF STRAIGHT LINES

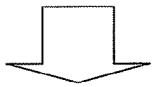

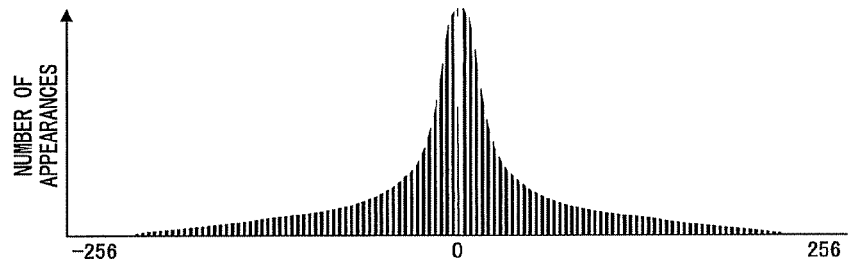

(B') DIFFERENCE VALUE APPEARANCE FREQUENCY DISTRIBUTION OF
BOTH ENDS COORDINATES OF STRAIGHT LINES (AFTER CONVERSION)

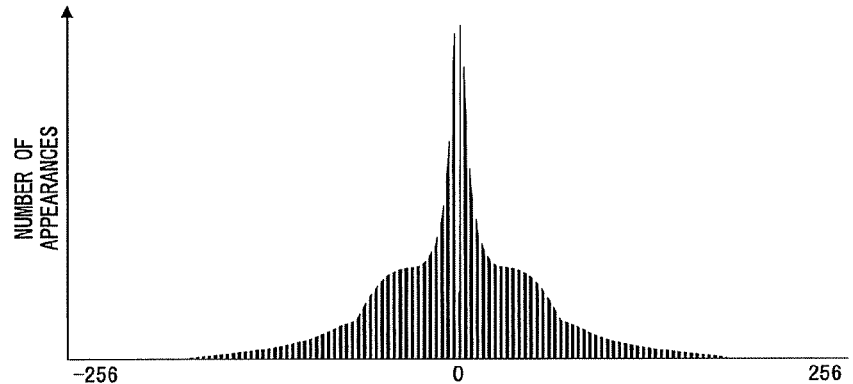

(C) TOTALED DIFFERENCE VALUE APPEARANCE
FREQUENCY DISTRIBUTION A+B'

F I G. 4

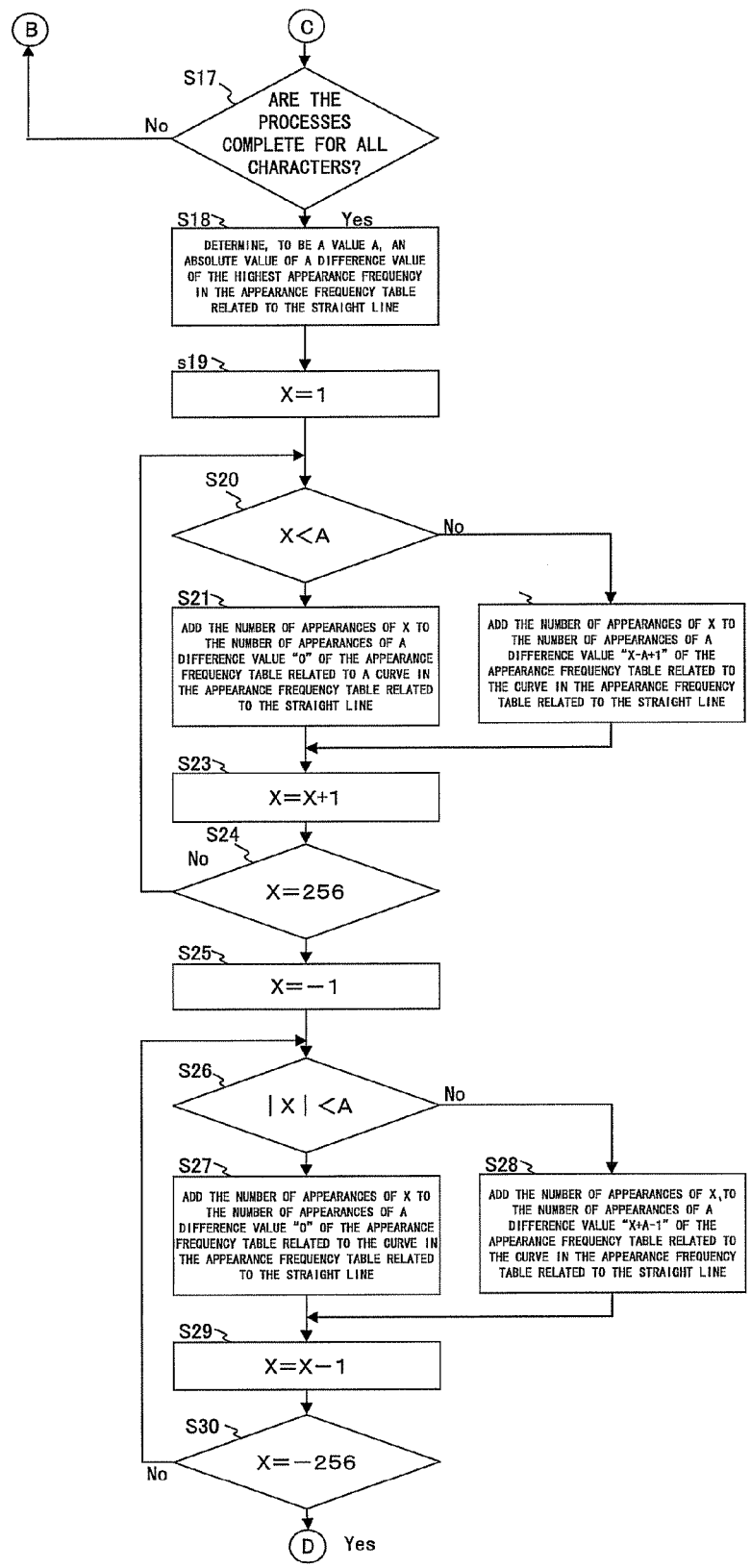
F I G. 5 B

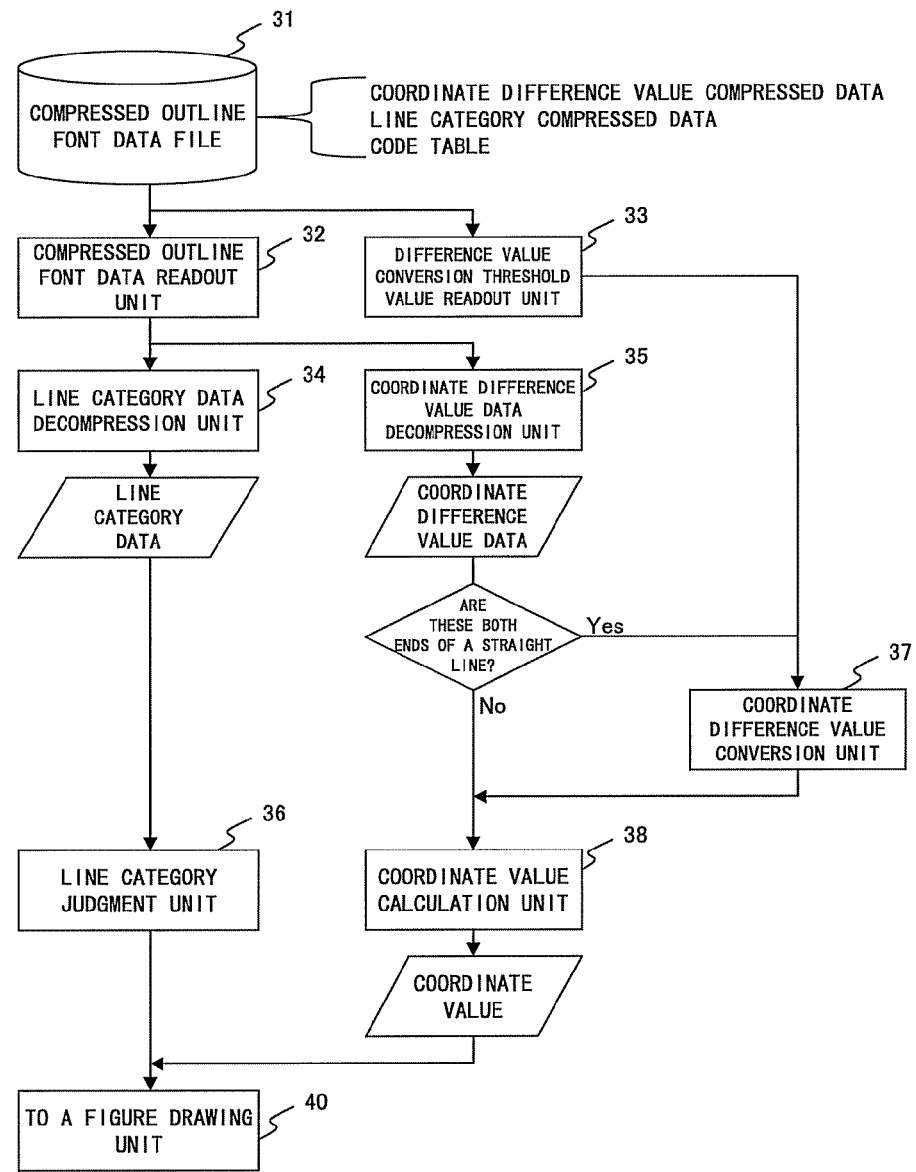
F I G. 6

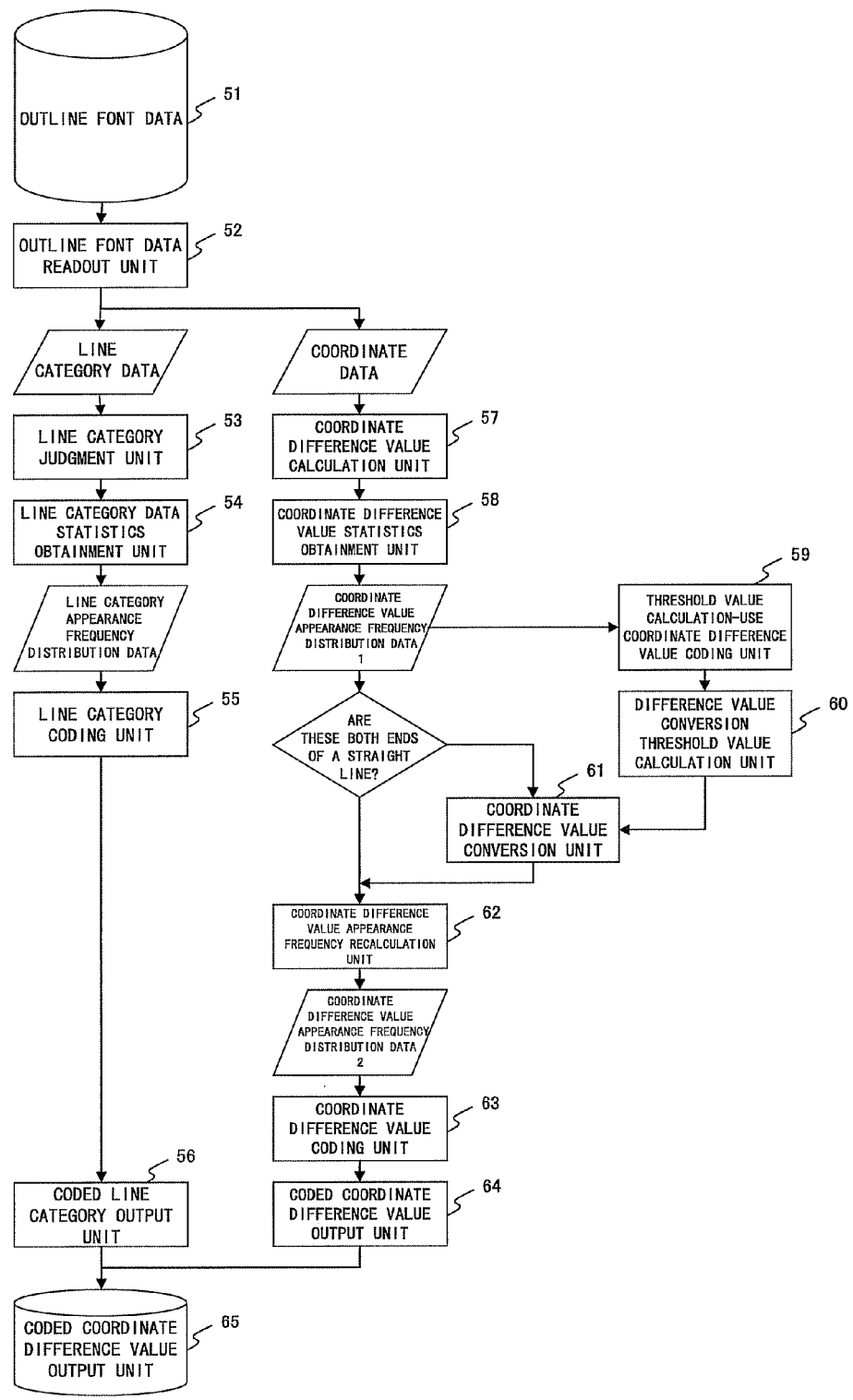
F I G. 8

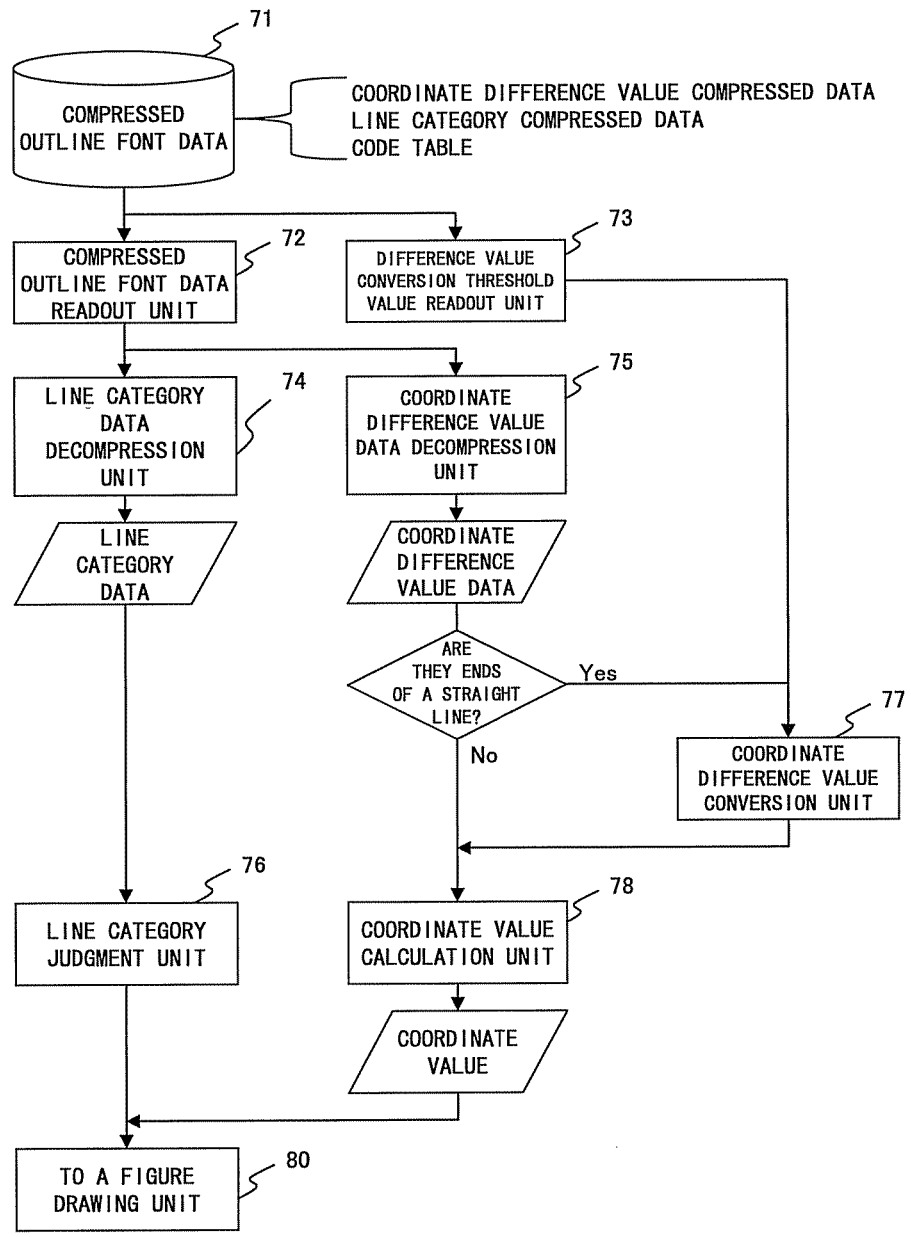
F I G. 1 1

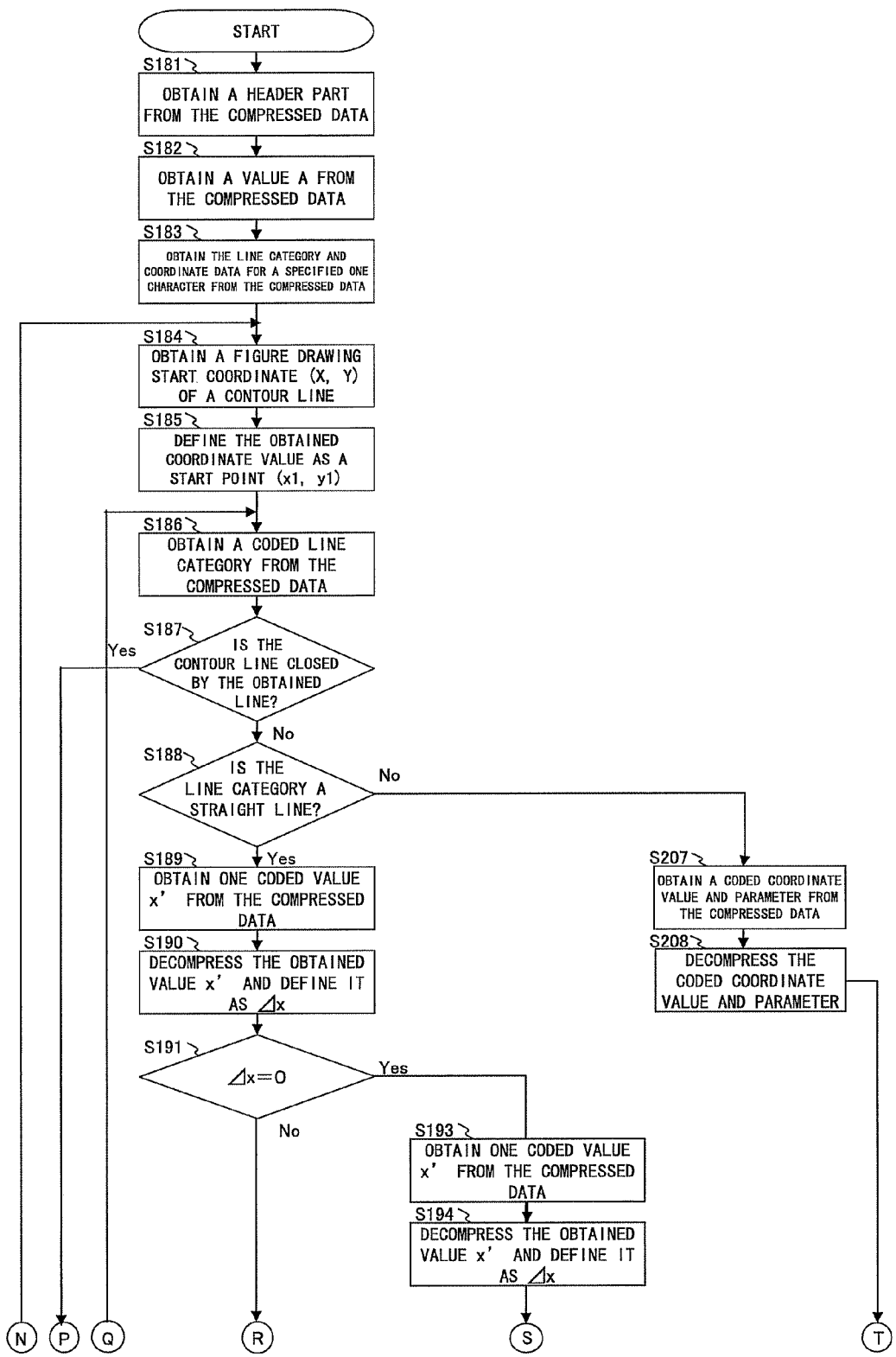
F I G. 1 2 A

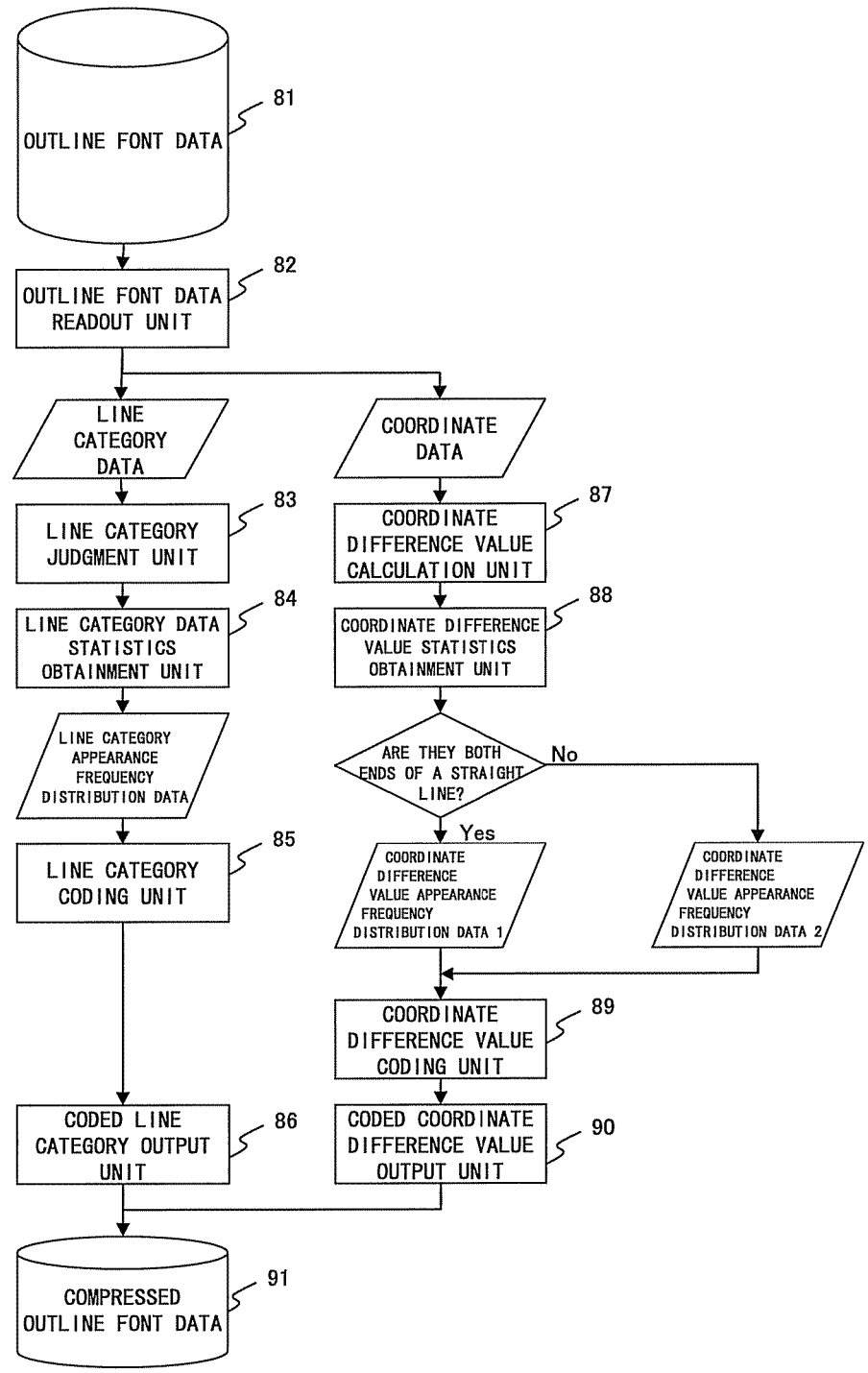
F I G. 13

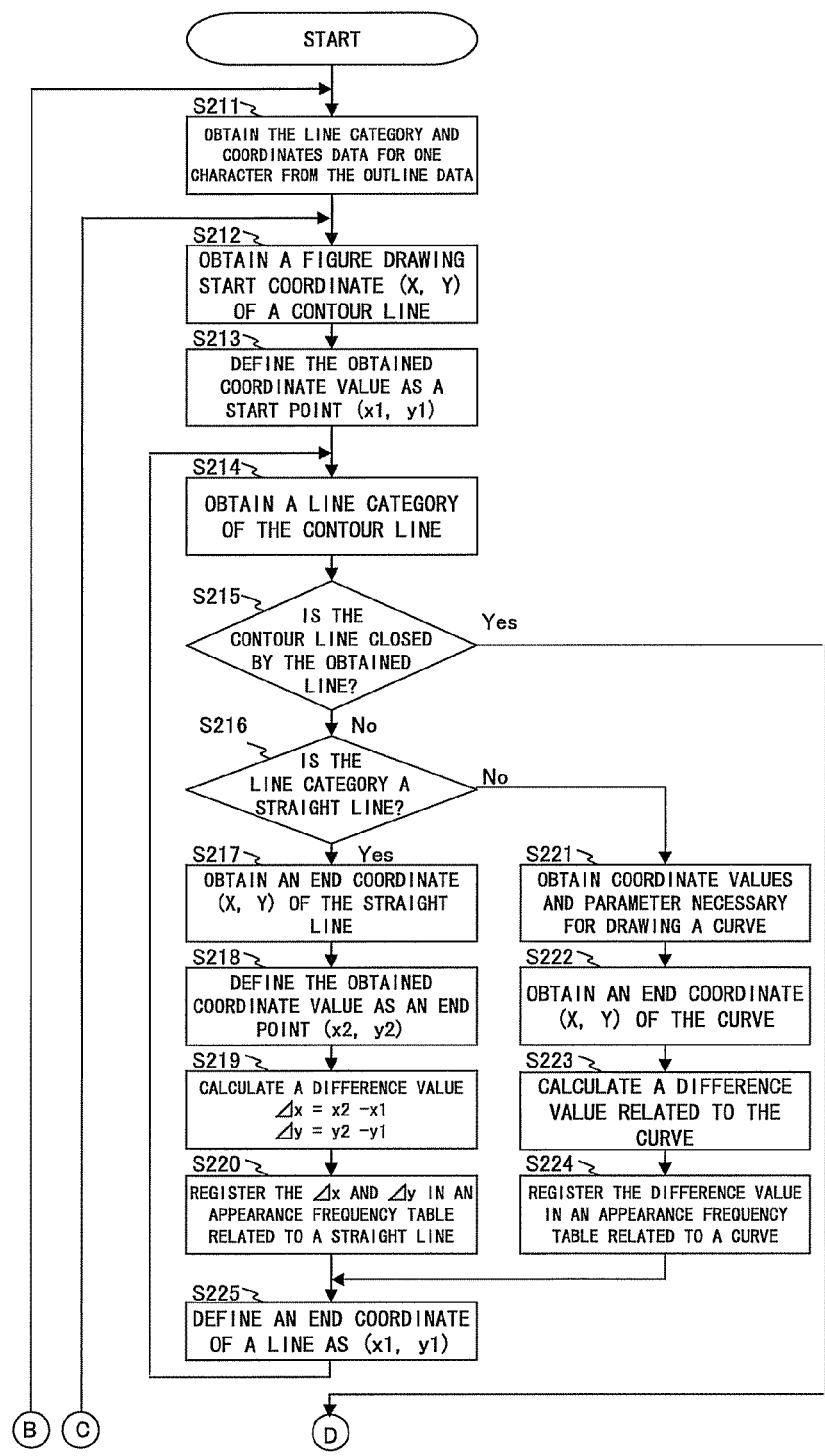
F I G. 1 4 A

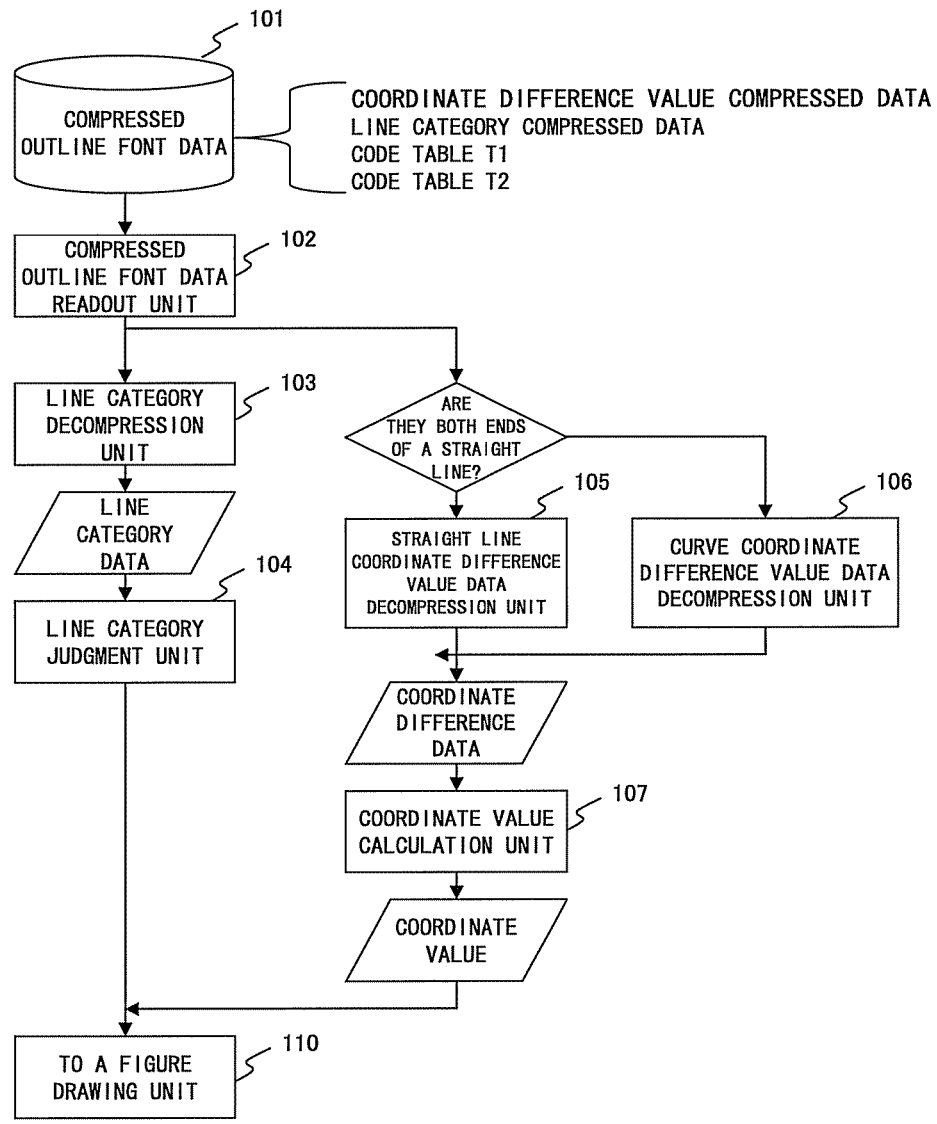
F I G. 1 5

OUTLINE FONT COMPRESSION METHOD AND OUTLINE FONT DECOMPRESSION METHOD

BACKGROUND OF THE INVENTION

1. Field of the Invention

The present invention relates to an outline font compression method, and to a decompression method, for reducing a data size of an outline font by improving a compression ratio by means of a statistical compression method utilizing a fact of an occurrence of difference in appearance frequency of a value in the case of expressing respective coordinate values of both ends of a line by a difference depending on a kind of the line.

2. Description of the Related Art

As a first of a conventional techniques for minimizing a data size of an outline font by using a statistical compression method, a patent document 1 listed below notes a font data compression method that predicts a control point of a curve part and compresses by using a relative value against the predicted point in order to further improve a compression efficiency based on a premise on compressing a relative value of a coordinate value from a last control point by means of a Huffman method or such.

Likewise, as a second of a conventional techniques for minimizing a data size of an outline font by using a statistical compression method, a patent document 2 listed below notes a font data compression method that minimizes a data size of an outline font by performing processes such as removing an offset of data, converting data into a notation system of base X, and predicting coordinate data by using a linear method and an error correction method, thereby reducing a memory volume.

FIG. 1A is a diagram showing an outline configuration of a font data compression system according to the aforementioned conventional technique; and FIG. 1B is a diagram showing an outline configuration of a font data decompression system according to the aforementioned conventional technique. Referring to FIG. 1A, the conventional font data compression system comprises an outline data file 111 for storing outline font data, an outline font data readout unit 112 for reading the outline font data from the outline data file 111, a line category judgment unit 113 for judging a line category from readout line category data, a line category data statistics obtainment unit 114 for obtaining a statistics of the judged line categories, a line category coding unit 115 for performing a line category coding based on line category appearance frequency distribution data, a coded line category output unit 116 for outputting a coded line category, a coordinate prediction unit 117 for predicting a coordinate of the line category based on readout coordinate data, an error calculation unit 118 for calculating an error against the predicted value based on readout coordinate data, a coordinate value coding unit 119 for coding a coordinate value corrected by a calculated error, a coded coordinate value output unit 120 for outputting a coded coordinate value, and a compression outline font data file 121 for storing a coded line category and a coded coordinate value that are respectively output.

Referring to FIG. 1B, the conventional font data decompression system comprises a compressed outline data file 131 for storing compressed font data compressed by the font data compression system noted above, a compressed outline font data readout unit 132 for reading the compressed outline font data, a data decoding unit 133 for decoding line category data and coordinate data from the readout compressed outline data, a line category judgment unit 134 for judging the line category from the decoded line category data, a coordinate prediction unit 135 for predicting a coordinate by using the decoded coordinate data, and an error correction unit 136 for correcting an error against a prediction value and outputting a post-correction coordinate value. The judged and output line category and the error-corrected and output coordinate value are respectively input to a figure drawing unit 140 that in turn draws a figure based on the input data.

The font data compression and decompression systems according to the conventional technique for predicting a coordinate as described above are required to carry out a process for calculating an angle between lines for predicting a point appearing next at the time of a compression, and that for calculating a coordinate by using the angle, and moreover, is necessary to perform these processes at the time of drawing a figure that requires a real time process, and therefore is not efficient in terms of speed for equipment such as a portable phone.

Meanwhile, a prediction of coordinates not only makes it impossible to obtain an effect of a compression by the prediction but also fails to prevent a degradation of a compression ratio in cases other than one in which a pair of straight lines intersects with each other at about the same angle and the distance between the straight lines is about the same.

Patent document 1: Laid-Open Japanese Patent Application Publication No. H05-94526
Patent document 2: Laid-Open Japanese Patent Application Publication No. H05-143048

SUMMARY OF THE INVENTION

The purpose of the present invention is to improve compression efficiency by calculating coordinate difference value appearance frequency distribution data by applying statistics to difference values of adjacent coordinates on a contour of a font, calculating and retaining a difference value conversion threshold value based on the distribution data and applying a conversion process to the difference values by using the difference value conversion threshold value so that an appearance frequency distribution of the difference values related to a category of line being a straight line resembles that of the difference values related to a category of lines being other than a straight line without carrying out a process of a prediction, followed by coding the coordinate difference value by using a statistical compression method.

In order to achieve the purpose described above, an outline font compression method according to the present invention compresses a difference of coordinate values stored adjacent to each other by means of a statistical coding system when reading out outline font data storing coordinate values necessary for drawing a contour of a character in order of drawing the contour in a clockwise or counterclockwise direction and also a category of a line connecting a pair of coordinates simultaneously, followed by compressing the coordinate values of the outline font data. A value of a result of subtracting "A−1" from a difference of coordinate values is determined to be a difference value of coordinates if the difference of coordinate value is equal to or greater than a certain value A, and a code expressing the difference value of "0" is added in front of the codes of difference values that are smaller than the value A in the case of a category of line connecting adjacent coordinates to each other being a straight line.

As noted above, the present invention is contrived to apply a statistics to difference values of adjacent coordinates on a contour of a font and a conversion process to the difference values so that an appearance frequency distribution of the difference values related to a category of line being a straight line resembles that of the difference value related to a category of lines being other than a straight line when coding by using a statistical compression method, followed by performing a recoding, thereby enabling an improvement of compression efficiency.

BRIEF DESCRIPTION OF THE DRAWINGS

FIG. 3 is a configuration diagram of an outline font compression system according to a first embodiment of the present invention;

FIG. 4 is a diagram exemplifying an appearance frequency distribution (of a gothic family font) of difference values related to a straight line and a curve according to the first embodiment of the present invention;

FIG. 5B is a flow chart for describing an operation of an outline font compression system according to the first embodiment of the present invention;

FIG. 6 is a configuration diagram of an outline font decompression system according to a first embodiment of the present invention;

FIG. 8 is a configuration diagram of an outline font compression system according to a second embodiment of the present invention;

FIG. 11 is a block diagram showing a brief configuration of an outline font decompression system according to the second embodiment of the present invention;

FIG. 12A is a flow chart for describing an operation of an outline font decompression system according to the second embodiment of the present invention;

FIG. 13 is a configuration diagram of an outline font compression system according to a third embodiment of the present invention;

FIG. 14A is a flow chart for describing an operation of an outline font compression system according to the third embodiment of the present invention;

FIG. 15 is a configuration diagram of an outline font decompression system according to a third embodiment of the present invention;

DESCRIPTION OF THE PREFERRED EMBODIMENTS

The following is a description of the preferred embodiment of the present invention by referring to the accompanying drawings.

Figures 1A, 1B:
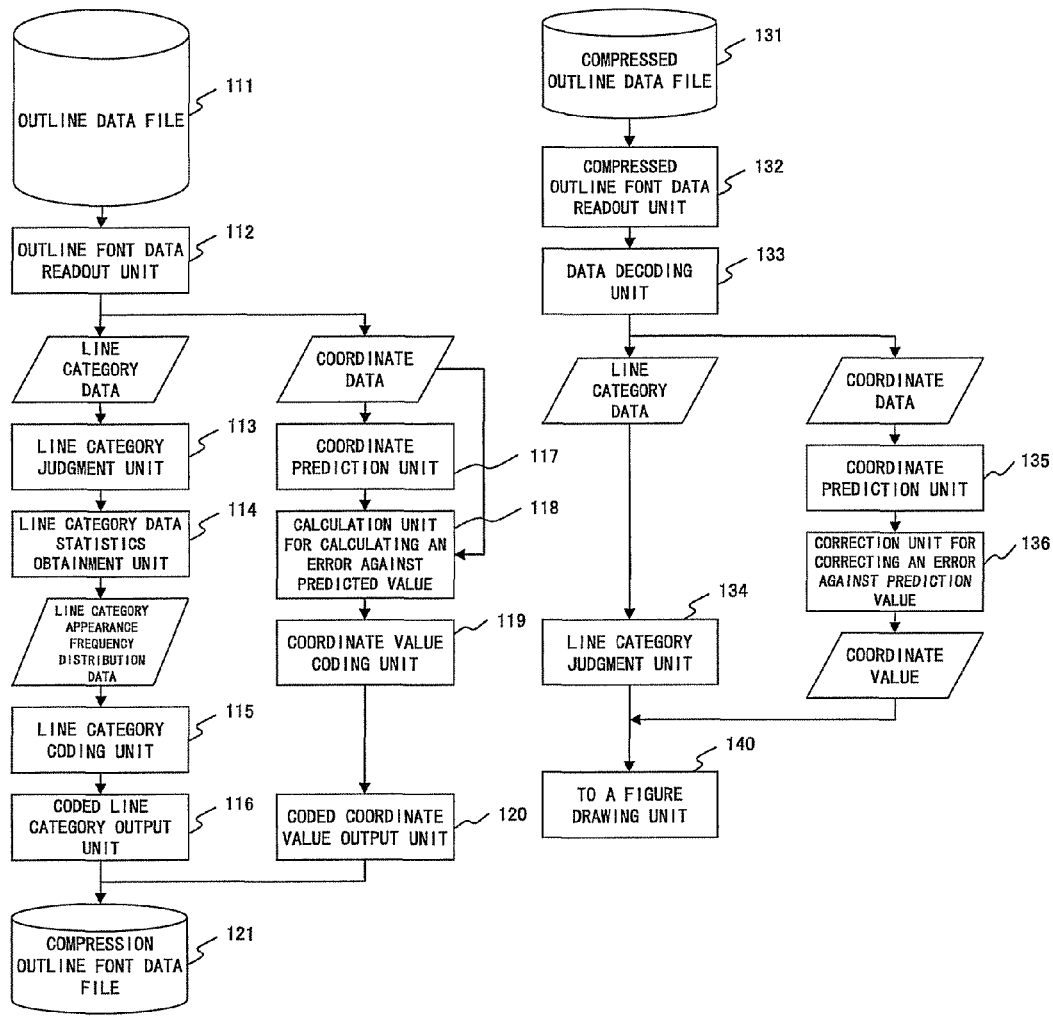
FIG. 1 is a diagram showing a configuration of a conventional outline font compression and decompression system.
Figure 2:
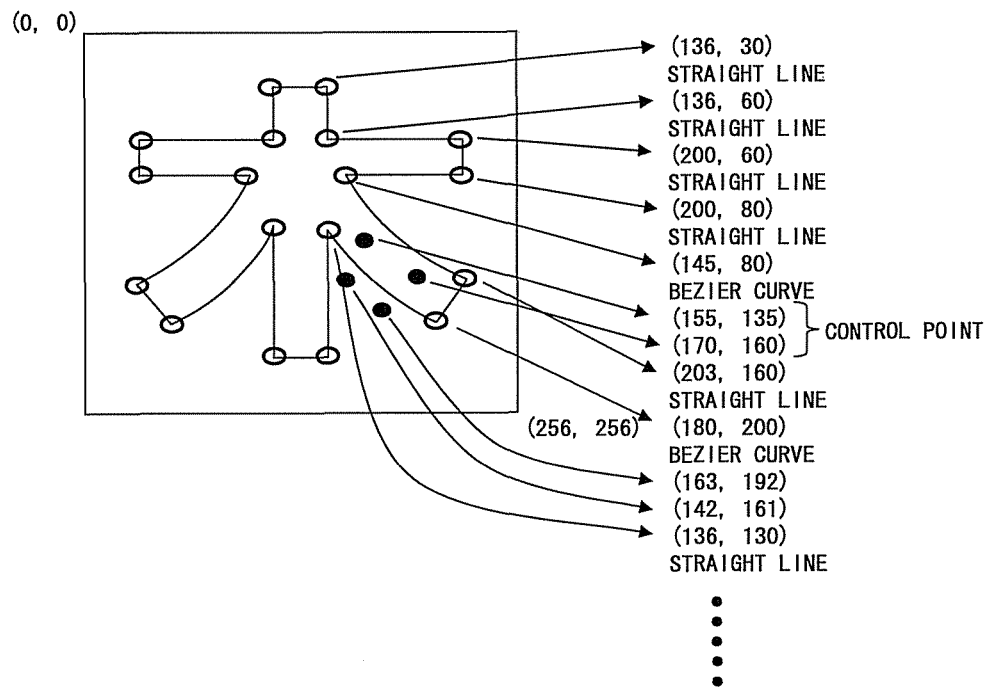
FIG. 2 is a diagram showing a common outline font data description method.

Outline font data is commonly constituted by a header part describing such as a nature of data, and by a part describing a contour of each character. FIG. 2 is a diagram showing a common outline font data description method. The present embodiment uses a coordinate value (indicated by X- and Y-coordinates) as data describing a contour of a Kanji (or Chinese) character meaning "tree" and a kind (which is alternatively called as "category" in this specification) of a line (i.e., a straight line, Bezier curve, or such) connecting each coordinate (which is expressed by a singular form in this specification, unless otherwise noted, for dealing with a pair of coordinate points connected by a line in many cases although "coordinates" is normally expressed by a plural form for having X- and Y-coordinates at least) in order of drawing a contour in clockwise (CW) starting from one point of a closed curve as shown in FIG. 2. Note that one may alternatively use a description in order of contour drawing in counterclockwise (CCW) starting from one point of a closed curve. Also, the present embodiment premises a use of those of which original outline data is designed by a size of 256*256 pixels.

[First Embodiment]

FIG. 3 is a configuration diagram of an outline font compression system according to a first embodiment of the present invention. Referring to FIG. 3, the outline font compression system according to the first embodiment of the present invention comprises an outline data file 11 for storing outline font data, an outline font data readout unit 12 for reading line category data and coordinate data from the outline font data, a line category judgment unit 13 for judging a line category from the readout line category data, a line category data statistics obtainment unit 14 for taking statistics related to the line category data and obtaining line category appearance frequency distribution data, a line category coding unit 15 for performing a line category coding based on the line category appearance frequency distribution data, a coded line category output unit 16 for outputting a coded line category, a coordinate difference calculation unit 17 for calculating a difference of adjacent coordinate values based on the readout coordinate data, a coordinate different value statistics obtainment unit 18 for taking statistics on coordinate difference values and obtaining coordinate difference value appearance frequency distribution data, a difference value conversion threshold value calculation unit 19 for calculating and retaining a difference value conversion threshold value (i.e., a value of the highest appearance frequency in terms of frequencies of absolute values of difference values related to difference values of respective adjacent coordinates as both ends of respective straight lines) based on the (first) coordinate difference value appearance frequency distribution data, a coordinate difference value conversion unit 20 for applying a coordinate difference conversion to a difference value of adjacent coordinates as both ends of a straight line based on the difference value conversion threshold value retained in the difference value conversion threshold value calculation unit 19, a coordinate difference value appearance frequency recalculation unit 21 for recalculating coordinate difference value appearance frequency distribution data for a straight line to which a coordinate difference conversion is applied and that for other coordinate values, a coordinate difference value coding unit 22 for coding a coordinate difference value based on the (second) coordinate difference value appearance frequency distribution data, a coded coordinate difference value output unit 23 for outputting a coded coordinate difference value, and a compressed outline font data file 24 for storing a coded line category and a coded coordinate difference value that are respectively output.

FIG. 4 is a diagram exemplifying an appearance frequency distribution (of a gothic family font) of difference values related to a straight line and a curve according to the first embodiment of the present invention. Describing FIG. 4 based on the comprisal shown by FIG. 3, a taking of statistics related to a font type being the gothic family fonts at the coordinate different value statistics obtainment unit 18 enables an obtainment of a difference value appearance frequency distribution (A) of coordinates constituting curves and a difference value appearance frequency distribution (B) of the both ends coordinates of straight lines. Considering the fact that the appearance frequencies of difference values are low where the absolute values thereof are small, while those of difference values are widely distributed down to the range where the absolute values are large in the difference value appearance frequency distribution (B) of both ends coordinates of straight lines, the first embodiment of the present invention is configured such that the difference value conversion threshold value calculation unit 19 obtains by calculation of a difference value conversion threshold value (that is defined as A) as a value at which an appearance frequency of difference values indicates a peak. The coordinate difference value conversion unit 20 applies conversions of making a value of a result of subtracting "A−1" from a difference of coordinate values, which is equal to or greater than the threshold value A, as the difference of coordinates and of adding a code expressing the difference value of "0" in front of the codes of difference values that are smaller than the value A. After such conversions, the coordinate difference value appearance frequency recalculation unit 21 recalculates a difference value appearance frequency distribution of both ends coordinates of straight lines, thereby obtaining a difference value appearance frequency distribution (B'). The coordinate difference value coding unit 22 performs a coordinate difference value coding based on a difference value appearance frequency distribution (C) of a total of the difference value appearance frequency distribution (A) of coordinates constituting curves and difference value appearance frequency distribution (B') of both ends coordinates of straight lines. As a result, the first embodiment of the present invention makes it possible to provide a larger compression effect improved by a larger bias of an appearance frequency of difference values rather than a data volume being increased as a result of adding the difference value of "0" as a flag, thereby enabling a reduction of an eventual post-compression data size.

FIGS. 5A through 5D are flow charts for describing an operation of an outline font compression system according to the first embodiment of the present invention. Lines other than a straight line include a Bezier curve, circular arc, and such, which are collectively represented by a "curve" in the present invention.

The next is a brief description of an operation of the outline font compression system according to the first embodiment of the present invention before proceeding to a description of the flow charts shown by FIGS. 5A through 5D. First step reads line categories of contour lines and coordinate values of the lines from contour line data of each of all characters stored in the outline font data file and calculates difference values of respective adjacent coordinates. The next, referring to an appearance frequency of an absolute value of the difference value only for the difference value of adjacent coordinates as both ends of a straight line, stores a value of the highest appearance frequency as a threshold value A. The next applies conversions of making a value of a result of subtracting "A−1" from a difference of coordinate values, which is equal to or greater than the threshold value A, as the difference of coordinates and of adding a code expressing the difference value of "0" in front of the codes of difference values that are smaller than the value A. These conversions are followed by performing a statistical coding by referring to an appearance frequency of all of the difference values. Also calculates an appearance frequency for a line category and performs a statistical coding. The next stores the statistically coded data in the compressed outline font file. The post-compression outline font data is a result of replacing the line category and coordinate data of the original outline font data with the coded data.

A description now turns to the flow charts shown by FIGS. 5A through 5D. First, referring to FIG. 5A:

S1: obtains the line category data and coordinates data for one character from the outline data S2: obtains a drawing start coordinate (X, Y) of a contour line S3: defines the obtained coordinate value as a start point $(x_1, y_1)$ S4: obtains a category of a line from the outline data S5: shifts to S16 if the contour line is closed by the obtained line, otherwise to S6

S6: shifts to S7 if the line category is a straight line, otherwise to S11

S7: reads an end coordinate (X, Y) of the straight line

S8: defines the coordinate value read in S7 as an end point $(x_2, y_2)$

S9: calculates a difference value $\Delta x = x_2 - x_1$ and $\Delta y = y_2 - y_1$ S10: registers the $\Delta x$ and $\Delta y$ in an appearance frequency table related to a straight line and shift to S15

S11: obtains the coordinate values and parameters necessary for drawing a curve

S12: obtains an end coordinate (X, Y) of the curve

S13: calculates a difference value related to the curve

S14: registers the difference value in an appearance frequency table related to the curve S15: defines an end coordinate of the line as $(x_1, y_1)$ and shifts to S4

S16: shifts to S2 if there is contour data for the character, otherwise to S17

Turning to FIG. 5B hereafter:

S17: shifts to S18 if the processes are complete for all characters, otherwise to S1

S18: determines, to be a value A, an absolute value of a difference value of the highest appearance frequency in the appearance frequency table related to the straight line S19: lets X=1

S20: shifts to S21 if the X is smaller than A, otherwise to S22

S21: adds the number of appearances of X to the number of appearances of a difference value "0" of the appearance frequency table related to a curve in the appearance frequency table related to the straight line, and shifts to S24

S22: adds the number of appearances of X to the number of appearances of a difference value "X−A+1" of the appearance frequency table related to the curve in the appearance frequency table related to the straight line S23: increments X by "1"

S24: shifts to S25 if the X is 256, otherwise to S20

S25: lets X=−1

S26: shifts to S27 if absolute value of X is smaller than A, otherwise to S28

S27: adds the number of appearances of X to the number of appearances of a difference value "0" of the appearance frequency table related to the curve in the appearance frequency table related to the straight line, and shifts to S30

S28: adds the number of appearances of X to the number of appearances of a difference value "X+A−1" of the appearance frequency table related to the curve in the appearance frequency table related to the straight line S29: decrements X by "1"

S30: shifts to S31 if the X is −256, otherwise to S26

Figure 5A:
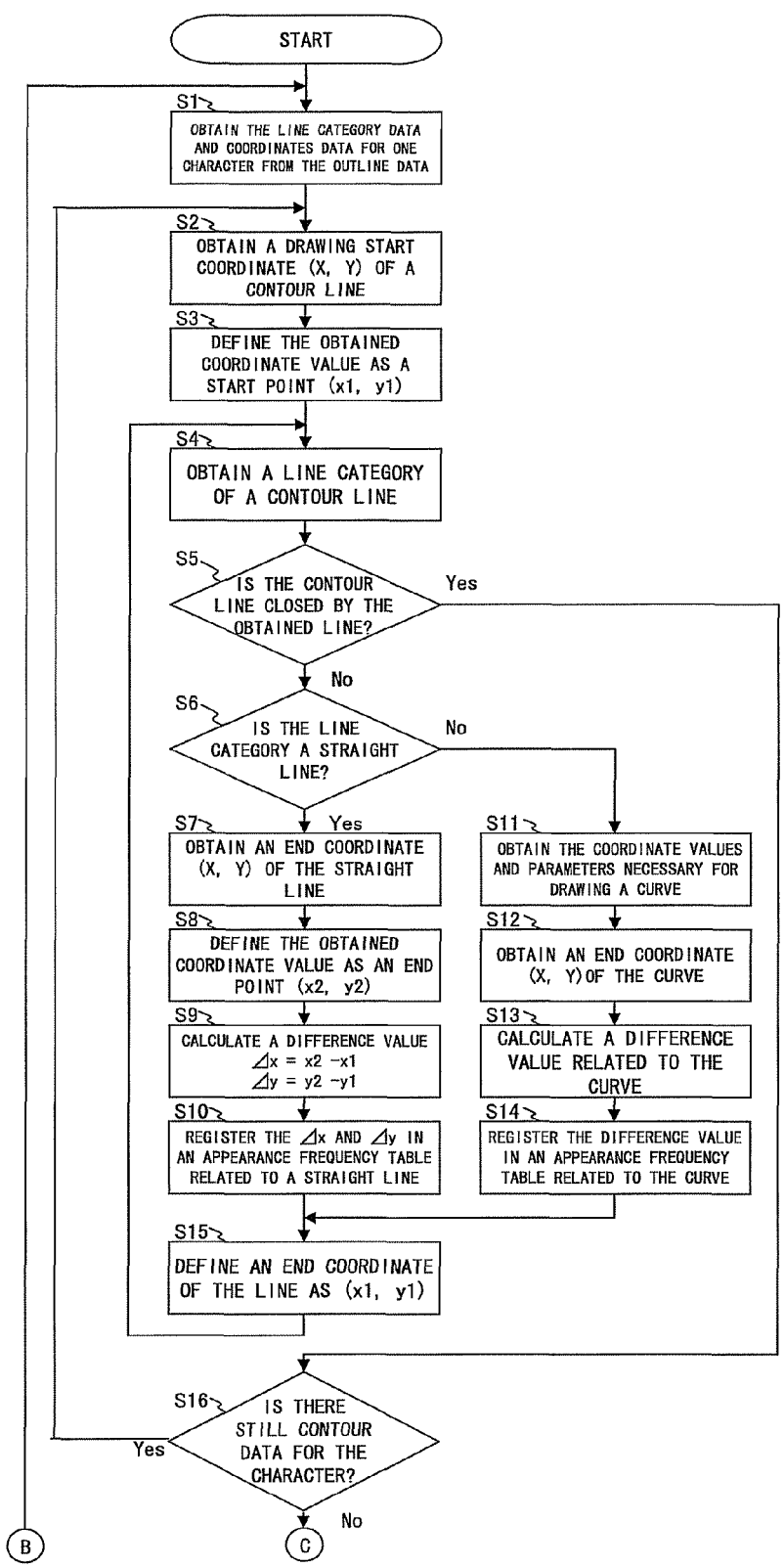
FIG. 5A is a flow chart for describing an operation of an outline font compression system according to the first embodiment of the present invention.
Figure 5C:
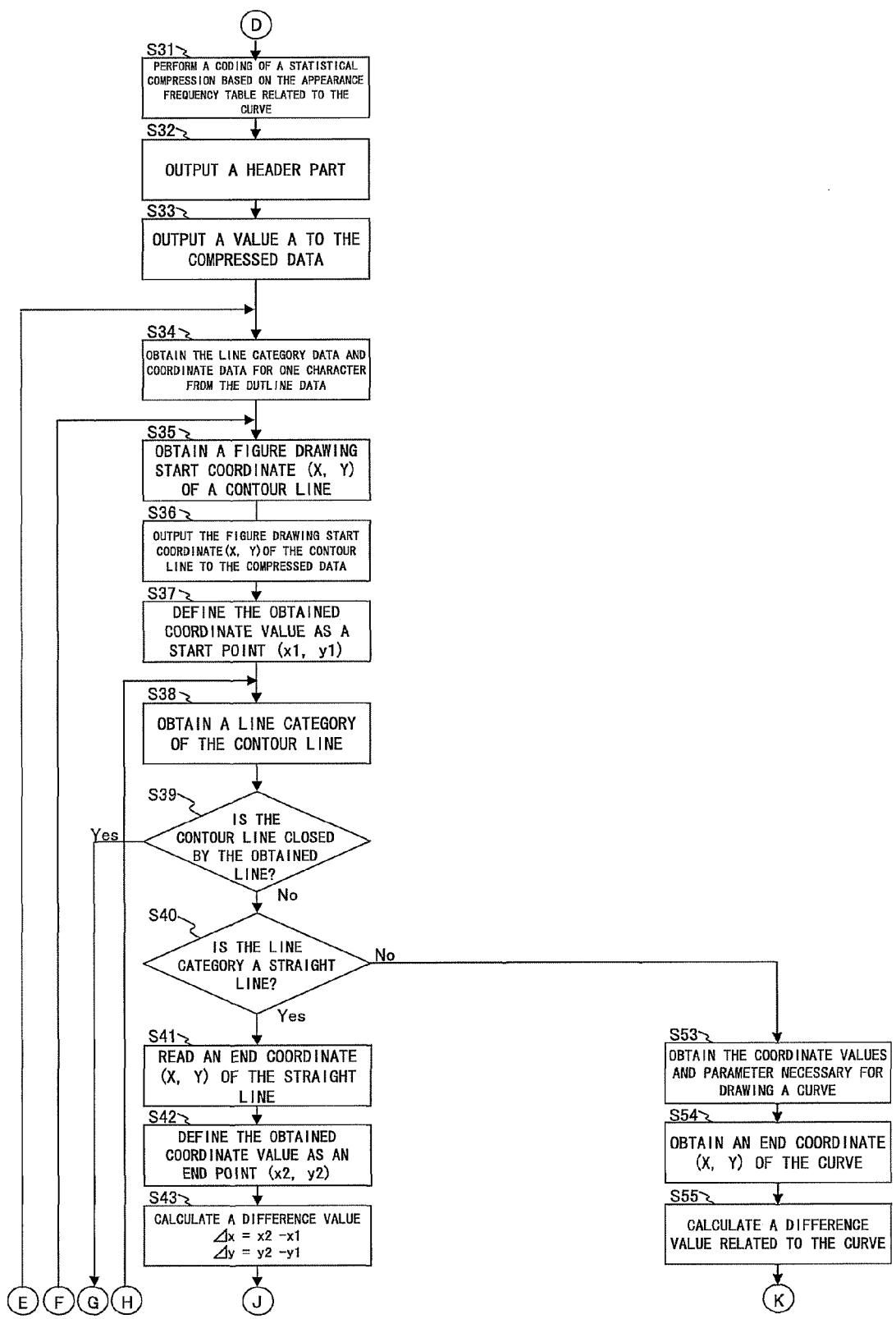
FIG. 5C is a flow chart for describing an operation of an outline font compression system according to the first embodiment of the present invention.

Turning to FIG. 5C hereafter:

S31: performs a coding of a statistical compression based on the appearance frequency table related to the curve S32: outputs, as compressed data, a header part including a table for decompression and such S33: outputs a value A to the compressed data S34: obtains the line category data and coordinate data for one character from the outline data S35: obtains a figure drawing start coordinate (X, Y) of a contour line S36: outputs the figure drawing start coordinate (X, Y) of the contour line to the compressed data S37: defines the obtained coordinate value as a start point $(x_1, y_1)$ S38: obtains a line category from the outline data S39: shifts to S59 if the contour line is closed by the obtained line, otherwise to S40

S40: shifts to S41 if the line category is a straight line, otherwise to S53

S41: reads an end coordinate (X, Y) of the straight line

S42: defines the readout coordinate value in S41 as an end point $(x_2, y_2)$

Figure 5D:
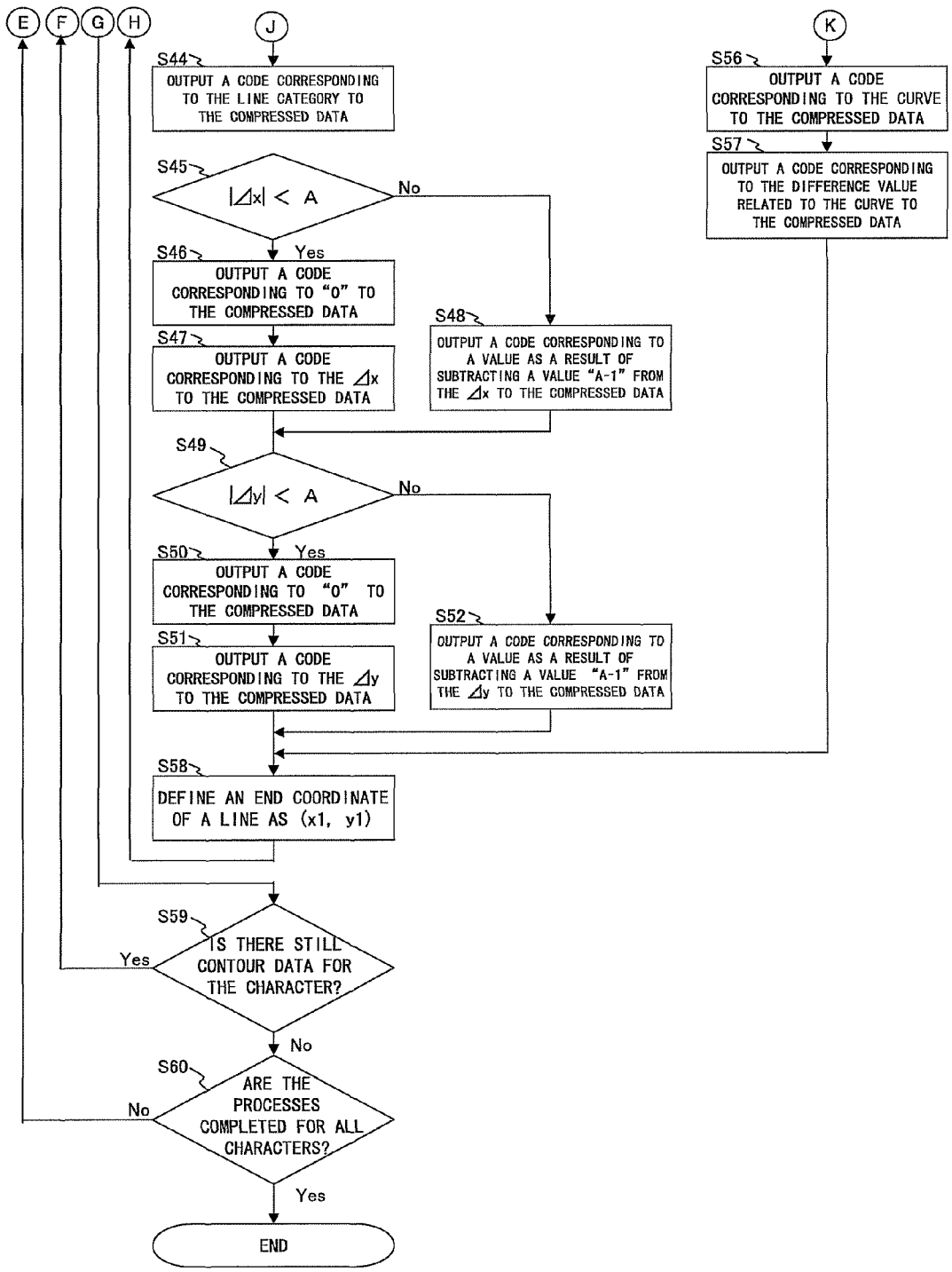
FIG. 5D is a flow chart for describing an operation of an outline font compression system according to the first embodiment of the present invention.

S43: calculates a difference value $\Delta x = x_2 - x_1$ and $\Delta y = y_2 - y_1$ Turning to FIG. 5D hereafter:

S44: outputs a code corresponding to the line category to the compressed data

S45: shifts to S46 if the $\Delta x$ is smaller than the value A, otherwise to S48

S46: outputs a code corresponding to "0" to the compressed data

S47: outputs a code corresponding to the $\Delta x$ to the compressed data, and shifts to S49

S48: outputs a code corresponding to a value as a result of subtracting a value "A−1" from the $\Delta x$ to the compressed data S49: shifts to S50 if the $\Delta y$ is smaller than the value A, otherwise to S52

S50: outputs a code corresponding to "0" to the compressed data

S51: outputs a code corresponding to the $\Delta y$ to the compressed data

S52: outputs a code corresponding to a value as a result of subtracting a value "A−1" from the $\Delta y$ to the compressed data, and shifts to S58

Returning to FIG. 5C hereafter:

S53: obtains the coordinate values and parameter necessary for drawing a curve

S54: obtains an end coordinate (X, Y) of the curve

S55: calculates a difference value related to the curve

Returning again to FIG. 5D hereafter:

S56: outputs a code corresponding to the curve to the compressed data

S57: outputs a code corresponding to the difference value related to the curve to the compressed data S58: define an end coordinate of a line as $(x_1, y_1)$ and shifts to S38

S59: shifts to S35 if there is contour data for the character, otherwise to S60

S60: ends the process if the processes are completed for all characters, otherwise to S34

FIG. 6 is a configuration diagram of an outline font decompression system according to a first embodiment of the present invention. Referring to FIG. 6, the outline font decompression system according to the first embodiment of the present invention comprises a compressed outline font data file 31 for storing font data (including coordinate difference value compressed data, line category compressed data, and code table) compressed by the above described compression system, a compressed outline font data readout unit 32 for reading compressed outline font data from the compressed outline font data file 31, a difference value conversion threshold value readout unit 33 for reading a difference value conversion threshold value from the compressed outline font data file 31 and retains the threshold value, a line category data decompression unit 34 for decompressing line category data from the readout compressed outline data, a coordinate difference value data decompression unit 35 for decompressing coordinate difference value data from the readout compressed outline data, a line category judgment unit 36 for judging a line category from the line category data, a coordinate difference value conversion unit 37 for applying a coordinate difference value conversion to a difference value of adjacent coordinates as both ends of a straight line in the coordinate difference value data based on a difference value conversion threshold value retained in the difference value conversion threshold value readout unit 33, and a coordinate value calculation unit 38 for calculating a coordinate value based on difference value data other than both ends of a straight line and converted coordinate difference value data related to both ends of a straight line. The outline font decompression system inputs both of the judged and output line category and output coordinate value to a figure drawing unit 40 that in turn draws a figure based on the input data.

Figure 7A:
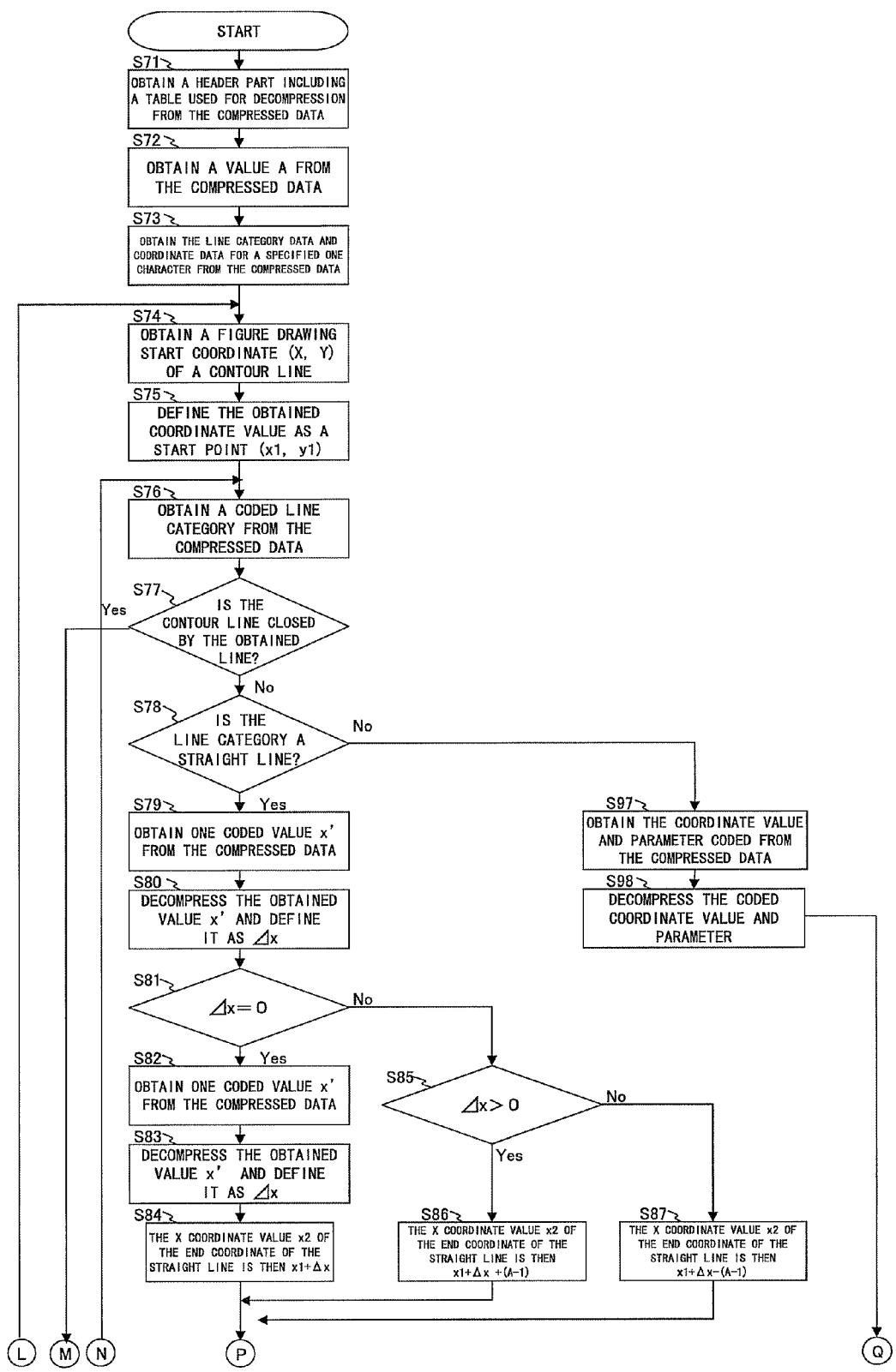
FIG. 7A is a flow chart for describing an operation of an outline font decompression system according to the first embodiment of the present invention.
Figure 7B:
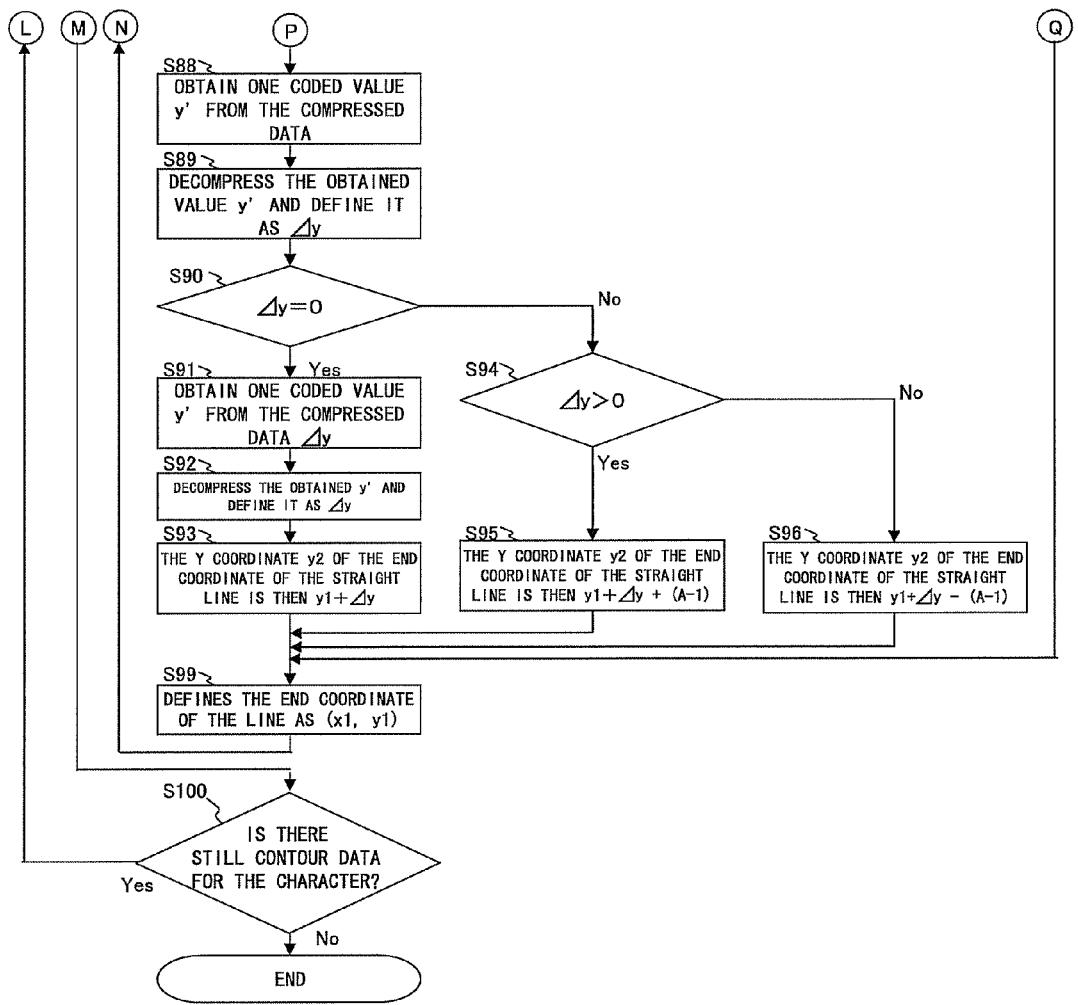
FIG. 7B is a flow chart for describing an operation of an outline font decompression system according to the first embodiment of the present invention.

FIGS. 7A and 7B show a flow chart for describing an operation of an outline font decompression system according to the first embodiment of the present invention. First, referring to FIG. 7A:

S71: obtains a header part including a table used for decompression from the compressed data S72: obtains a value A from the compressed data S73: obtains the line category data and coordinate data for a specified one character from the compressed data S74: obtains a figure drawing start coordinate (X, Y) of a contour line S75: define the obtained coordinate value as a start point $(x_1, y_1)$ S76: obtain a coded line category from the compressed data S77: shifts to S100 if the contour line is closed by the obtained line, otherwise to S78

S78: shifts to S79 if the line category is a straight line, otherwise to S97

S79: obtains one coded value x' from the compressed data

S80: decompresses the value x' obtained in S79 and defines it as $\Delta x$

S81: shifts to S82 if the $\Delta x$ is "0", otherwise to S85

S82: obtains one coded value x' from the compressed data

S83: decompresses the value x' obtained in S82 and defines it as $\Delta x$

S84: the X coordinate value $x_2$ of the end coordinate of the straight line is then $x_1+\Delta x$. Shifts to S88

S85: shifts to S86 if the $\Delta x$ is a positive value, otherwise to S87

S86: the X coordinate value $x_2$ of the end coordinate of the straight line is then $x_1+\Delta x+(A-1)$. Shifts to S88

S87: the X coordinate value $x_2$ of the end coordinate of the straight line is then $x_1+\Delta x-(A-1)$. Shifts to S88

Returning to FIG. 7B:

S88: obtains one coded value y' from the compressed data

S89: decompresses the value y' obtained in S88 and defines it as $\Delta y$

S90: shifts to S91 if the $\Delta y$ is "0", otherwise to S94

S91: obtains one coded value y' from the compressed data

S92: decompresses the y' obtained in S91 and defines it as $\Delta y'$

S93: the Y coordinate $y_2$ of the end coordinate of the straight line is then $y_1+\Delta y$ S94: shifts to S95 if the $\Delta y$ is a positive value, otherwise to S96

S95: the Y coordinate $y_2$ of the end coordinate of the straight line is then $y_1+\Delta y+(A-1)$. Shifts to S99

S96: the Y coordinate $y_2$ of the end coordinate of the straight line is then $y_1+\Delta y-(A-1)$. Shifts to S99

Returning to FIG. 7A:

S97: obtains the coordinate value and parameter coded from the compressed data

S98: decompresses the coded coordinate value and parameter obtained in S97

Returning again to FIG. 7B:

S99: defines the end coordinate of the line as $(x_1, y_1)$ and shifts to S76

S100: shifts to S74 if there still is contour data for the character, otherwise ends the process

[Second Embodiment]

FIG. 8 is a configuration diagram of an outline font compression system according to a second embodiment of the present invention. Referring to FIG. 8, the outline font compression system according to the second embodiment of the present invention comprises an outline data file 51 for storing outline font data, an outline font data readout unit 52 for reading out line category data and coordinate data from the outline font data, a line category judgment unit 53 for judging a line category from the readout line category data, a line category data statistics obtainment unit 54 for taking statistics on the line category data and obtaining line category appearance frequency distribution data, a line category coding unit 55 for performing a line category coding based on the line category appearance frequency distribution data, a coded line category output unit 56 for outputting the coded line category, a coordinate difference value calculation unit 57 for calculating a difference of adjacent coordinate value from the readout coordinate data, a coordinate difference value statistics obtainment unit 58 for taking statistics on coordinate difference values and obtaining coordinate difference value appearance frequency distribution data, a threshold value calculation-use coordinate difference value coding unit 59 for coding a coordinate difference value for calculating a difference value conversion threshold value from (first) coordinate difference value appearance frequency distribution data, a difference value conversion threshold value calculation unit 60 for calculating, and retaining, a difference value conversion threshold value from the coded coordinate difference value, a coordinate difference value conversion unit 61 for applying a coordinate difference conversion to a difference value of adjacent coordinates as both ends of a straight line based on the difference value conversion threshold value retained by the difference value conversion threshold value calculation unit 60, a coordinate difference value appearance frequency recalculation unit 62 for recalculating coordinate difference value appearance frequency distribution data for a line applied by the coordinate difference value conversion and other coordinate difference values, a coordinate difference value coding unit 63 for coding a coordinate difference value based on (second) coordinate difference value appearance frequency distribution data, a coded coordinate difference value output unit 64 for outputting the coded coordinate difference value, and a compressed outline font data file 65 for storing the respectively output coded line category and coded coordinate difference value.

Figure 9:
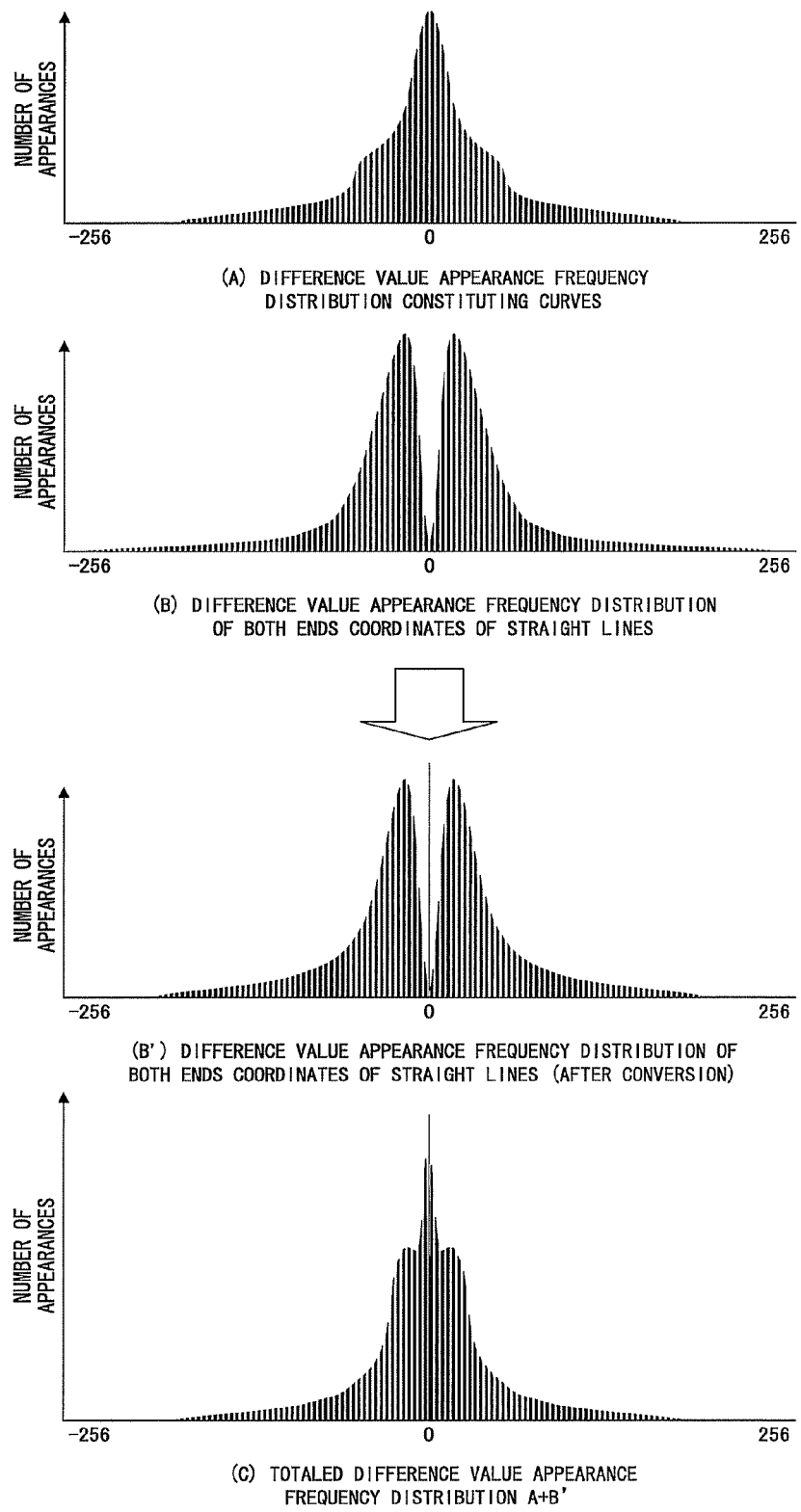
FIG. 9 is a diagram exemplifying an appearance frequency distribution (of a brush style family font) of difference values related to a straight line and a curve according to the second embodiment of the present invention.

FIG. 9 is a diagram exemplifying an appearance frequency distribution (of a brush style family font) of difference values related to a straight line and a curve according to the second embodiment of the present invention. Describing FIG. 9 based on the configuration shown by FIG. 8, the coordinate difference value statistics obtainment unit 58 taking statistics related to a font type being of brush style type face makes it possible to obtain a difference value appearance frequency distribution (A) constituting curves and a difference value appearance frequency distribution (B) of both ends coordinates of straight lines. Considering a characteristic showing that the appearance frequency of a difference value in large absolute value parts is low, and that the appearance frequency of a difference value in small absolute value parts is high, within the difference value appearance frequency distribution (B) of both ends coordinates of straight lines, the second embodiment of the present invention is configured such that the threshold value calculation-use coordinate difference value coding unit 59 obtains codes corresponding to respective difference values from the frequency distribution of difference values by performing a statistical coding. Then, the difference value conversion threshold value calculation unit 60 calculates a value so that a code length as a result of adding a code length of a code corresponding to a value that is a resultant value of subtracting a certain value A from a difference value X of which the absolute value is larger than the value A and a code length of the difference value "0" is smaller than a code length of a code corresponding to the X, determines the calculated value to be a difference value conversion threshold value A and retains it. Regarding the difference value conversion threshold value A, the coordinate difference value appearance frequency recalculation unit 62 applies, to difference values of coordinates of respective both ends of all straight lines, a conversion of determining, to be a difference value of coordinates, a value as a result of subtracting a threshold value A from the difference of coordinate values that is equal to or greater than the value A, followed by adding a code in front of the codes for expressing a difference value "0". After such a conversion, the coordinate difference value appearance frequency recalculation unit 62 recalculates a difference value appearance frequency distribution of both ends coordinate of a straight line, thereby obtaining a difference value appearance frequency distribution (B'). The coordinate difference value coding unit 63 performs a coordinate difference value coding based on a difference value appearance frequency distribution (C) totaling the difference value appearance frequency distribution (A) constituting curves and difference value appearance frequency distribution (B') of both ends coordinates of straight lines. As a result, the second embodiment of the present invention makes it possible to provide a larger effect of compression improved by a bias of appearance frequency of difference values than an increase of a data volume increased by adding a difference value "0" as a flag, thereby enabling an eventual reduction of a post-compression data size.

FIGS. 10A through 10E show a flow chart for describing an operation of an outline font compression system according to the second embodiment of the present invention. There are Bezier curve, circular arc and such among lines other than a straight line, while the present invention calls a curve as a representative of them.

The next is a brief description of an operation of the outline font compression system according to the second embodiment of the present invention before describing the flow chart shown by FIGS. 10A through 10E. The first step reads out line categories of contour lines and the coordinate values of the lines from contour line data of all characters stored in the outline data file, and calculates the difference value of adjacent coordinates. The next performs a statistical coding from the frequency distribution of the difference values and obtains codes corresponding to the respective difference values. It is followed by calculating a value so that a code length as a result of adding a code length of a code corresponding to a value that is a resultant value of subtracting a certain value A from a difference value X of which the absolute value is larger than the value A and a code length of the difference value "0" is smaller than a code length of a code corresponding to the X, determining the calculated value to be a difference value conversion threshold value A and retaining it. Regarding the difference value conversion threshold value A, the next applies, to difference values of coordinates of respective both ends of all straight lines, a conversion of determining, to be a difference value of coordinates, a value as a result of subtracting a threshold value A from the difference of coordinate values that is equal to or greater than the value A, followed by adding a code in front of the codes for expressing a difference value "0". After such a conversion, the next performs a statistical coding by referring to the appearance frequency of all difference values. The next also performs a statistical coding by calculating the appearance frequency of the line category. It is followed by storing the statistically coded data in the compressed outline font file. The compressed outline font data is a result of replacing the line category data and coordinate data of the original outline font by the coded data.

The next is a description of the flow charts shown by FIGS. 10A through 10E. First, referring to FIG. 10A:

S101: obtains the line category and coordinates data for one character from the outline data S102: obtains a figure drawing start coordinate (X, Y) of a contour line S103: defines the obtained coordinate value as a start point $(x_1, y_1)$ S104: obtains a line category from the outline data S105: shifts to S116 if the contour line is closed by the obtained line, otherwise to S106

S106: shifts to S107 if the line category is a straight line, otherwise to S111

S107: reads an end coordinate (X, Y) of the straight line

S108: defines the coordinate value read out in S107 as an end point $(x_2, y_2)$ S109: calculates a difference value $\Delta x = x_2 - x_1$ and $\Delta y = y_2 - y_1$ S110: registers the $\Delta x$ and $\Delta y$ in the appearance frequency table related to a straight line. Then shifts to S115

S111: obtains the coordinate values and parameter necessary for drawing a curve S112: reads an end coordinate (X, Y) of the curve S113: calculates a difference value related to the curve S114: register the difference value in the appearance frequency table related to the curve S115: defines an end coordinate of a line as $(x_1, y_1)$ and shifts to S104

S116: shifts to S102 if there still is contour data for the character, otherwise to S117

Figure 10A:
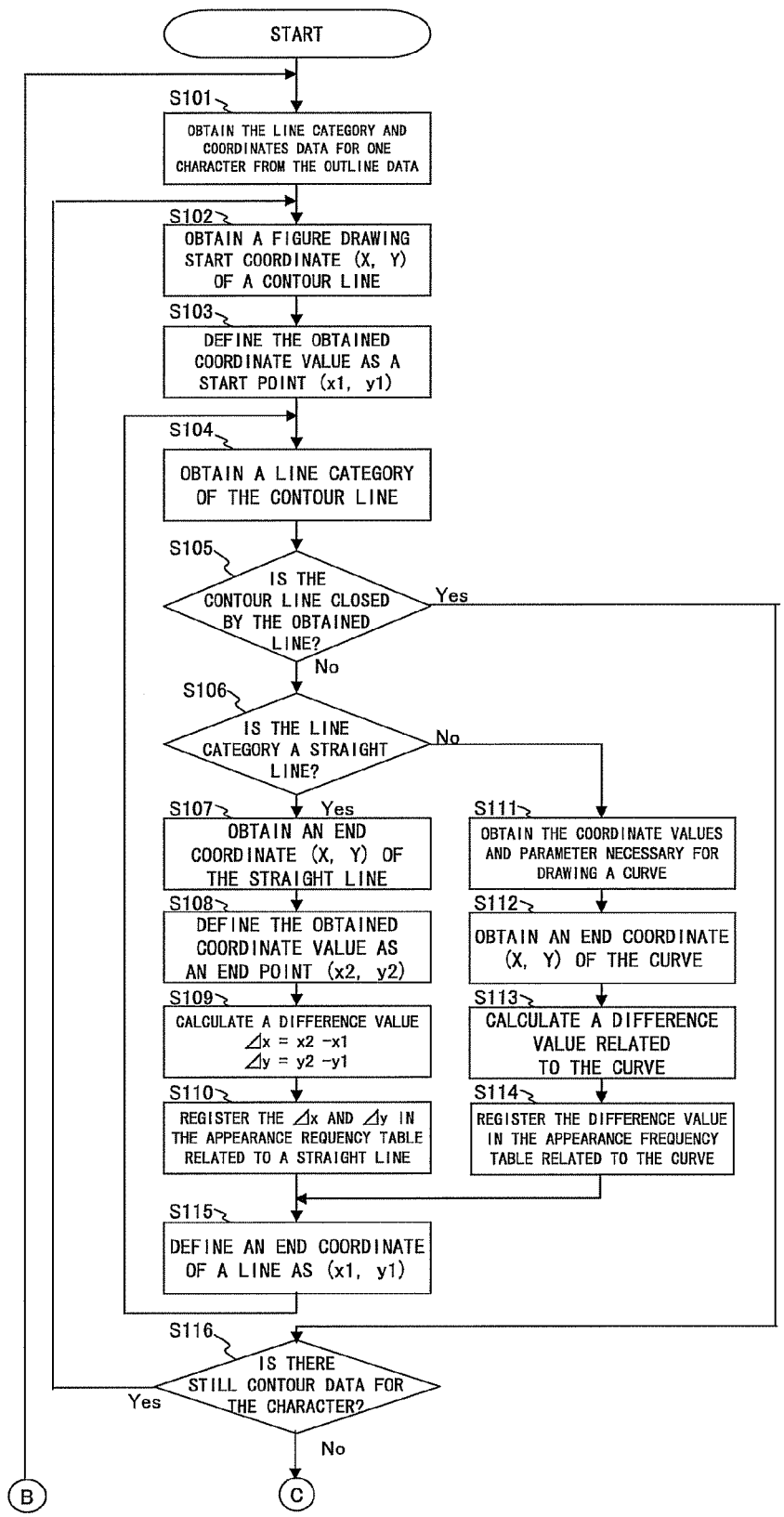
FIG. 10A is a flow chart for describing an operation of an outline font compression system according to the second embodiment of the present invention.
Figure 10B:
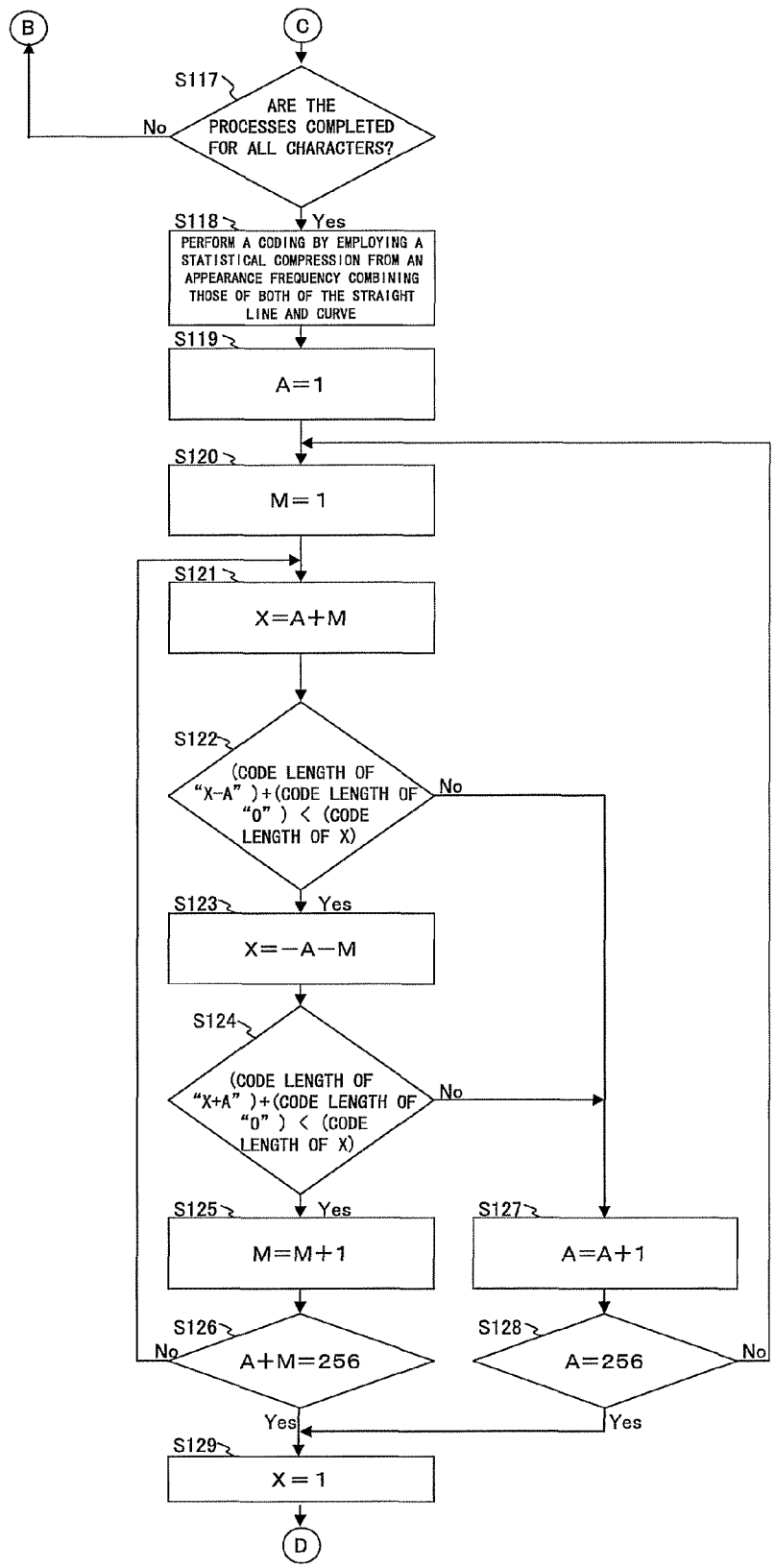
FIG. 10B is a flow chart for describing an operation of an outline font compression system according to the second embodiment of the present invention.

Turning to FIG. 10B hereafter:

S117: shifts S118 if the processes are completed for all characters, otherwise to S101

S118: performs a coding by employing a statistical compression from an appearance frequency combining those of both of the straight line and curve S119: lets A=1

S120: lets M=1

S121: lets a value of X as A+M

S122: shifts to S123 if a code length of a result of adding a code length of a code corresponding to a difference value "X−A" to a code length of a code corresponding to the difference value "0" is smaller than a code length corresponding to the difference value X, otherwise to S127

S123: lets a value of X as "−A−M"

S124: shifts to S125 if a code length of a result of adding a code length of a code corresponding to the difference value "X+A" to a code length of a code corresponding to the difference value "0" is smaller than a code length corresponding to the difference value X, otherwise to S127

S125: increments a value of M by "1"

S126: shifts to S129 if a total of a value of A and that of M is 256, otherwise to S121

S127: increments the value of A by "1"

S128: shifts to S129 if the value of A is 256, otherwise to S120

S129: lets a value of X as "1"

Figure 10C:
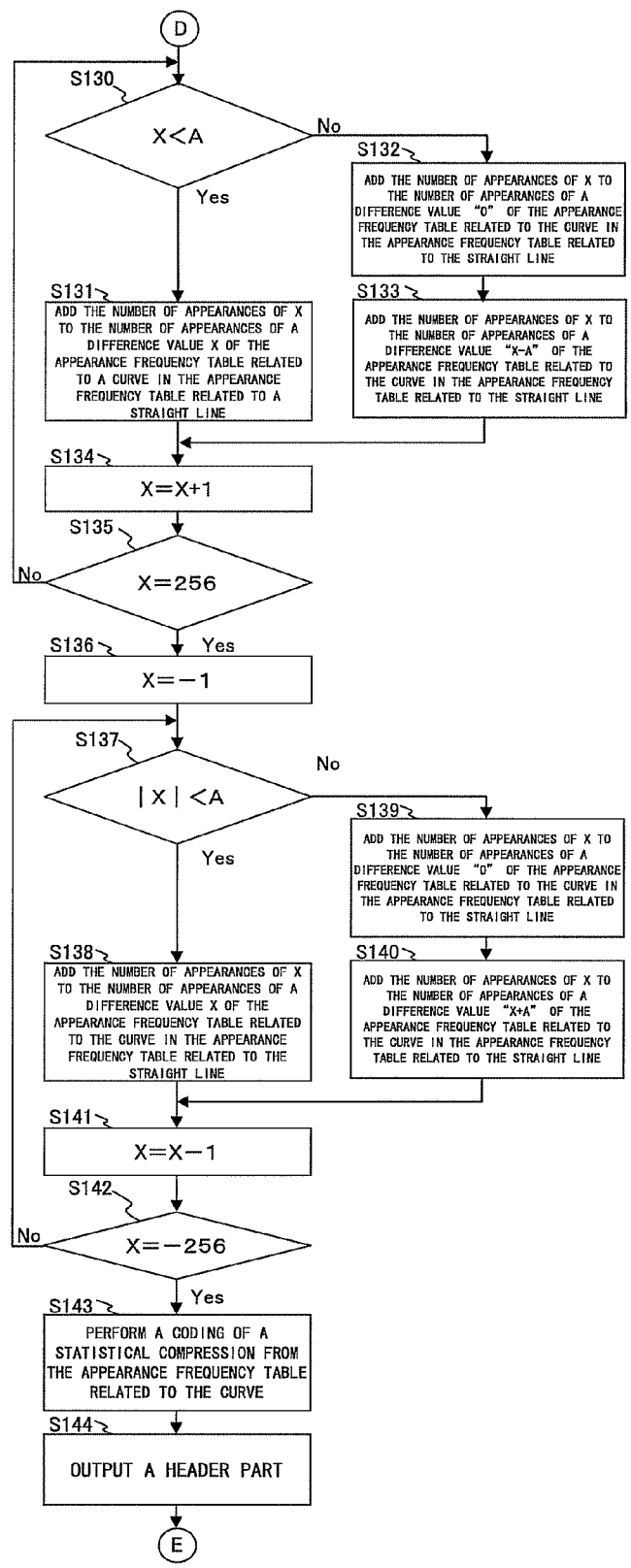
FIG. 10C is a flow chart for describing an operation of an outline font compression system according to the second embodiment of the present invention.

Turning to FIG. 10C hereafter:

S130: shifts to S131 if the X is smaller than A, otherwise to S132

S131: adds the number of appearances of X to the number of appearances of a difference value X of the appearance frequency table related to a curve in the appearance frequency table related to a straight line and shifts to S134

S132: adds the number of appearances of X to the number of appearances of a difference value "0" of the appearance frequency table related to the curve in the appearance frequency table related to the straight line S133: adds the number of appearances of X to the number of appearances of a difference value "X−A" of the appearance frequency table related to the curve in the appearance frequency table related to the straight line S134: increments X by "1"

S135: shifts to S136 if the X is 256, otherwise to S130

S136: lets X=−1

S137: shifts to S138 if the absolute value of X is smaller than A, otherwise to S139

S138: adds the number of appearances of X to the number of appearances of a difference value X of the appearance frequency table related to the curve in the appearance frequency table related to the straight line and shifts to S141

S139: adds the number of appearances of X to the number of appearances of a difference value "0" of the appearance frequency table related to the curve in the appearance frequency table related to the straight line S140: adds the number of appearances of X to the number of appearances of a difference value "X+A" of the appearance frequency table related to the curve in the appearance frequency table related to the straight line S141: decrements X by "1"

S142: shifts to S143 if the X is −256, otherwise to S137

Figure 10D:
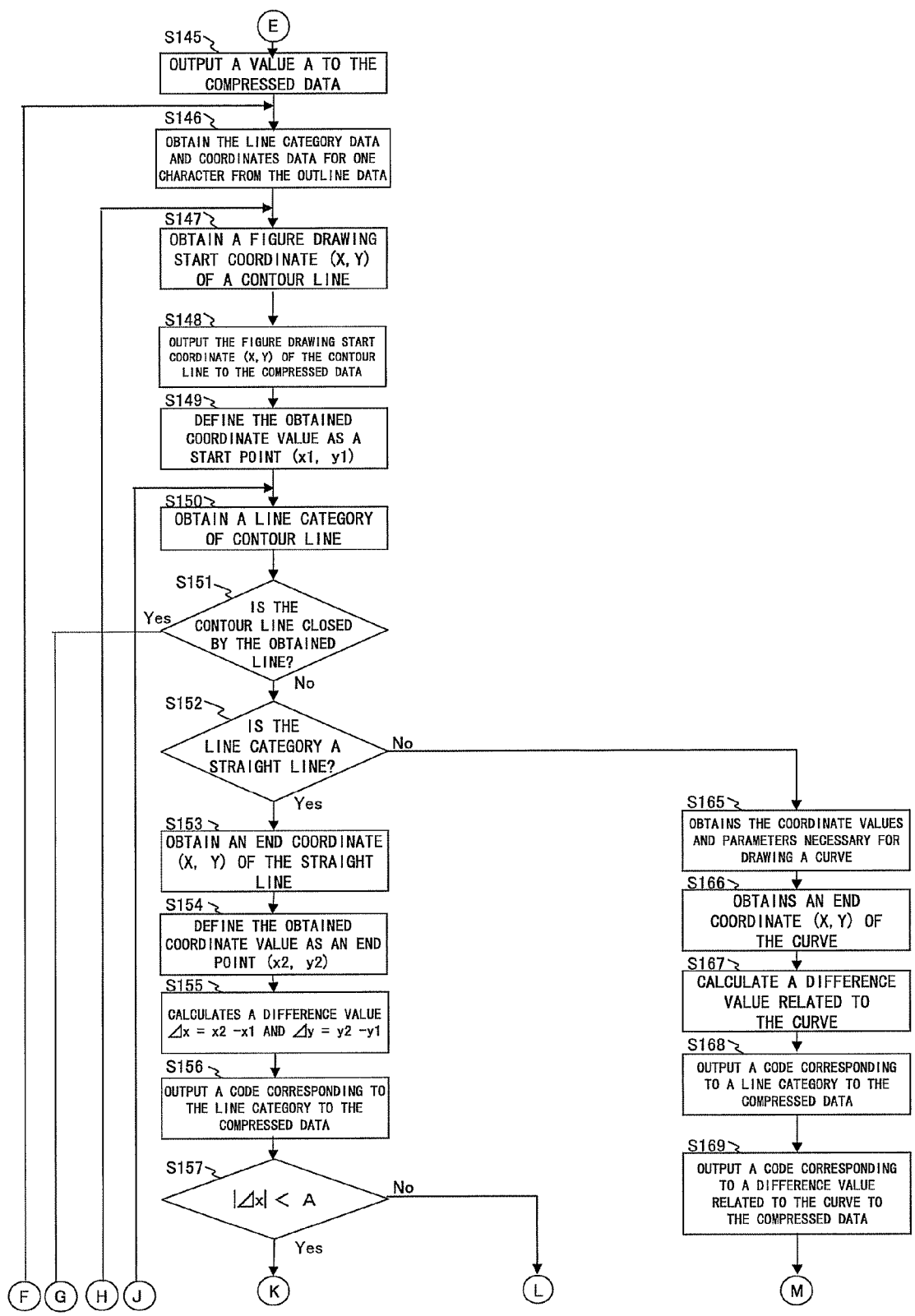
FIG. 10D is a flow chart for describing an operation of an outline font compression system according to the second embodiment of the present invention.

S143: performs a coding of a statistical compression from the appearance frequency table related to the curve S144: outputs a header part including such as a decompression-use table as compression data Turning to FIG. 10D hereafter:

S145: outputs a value A to the compressed data

S146: obtains the line category data and coordinates data for one character from the outline data S147: obtains a figure drawing start coordinate (X, Y) of a contour line S148: outputs the figure drawing start coordinate (X, Y) of the contour line to the compressed data S149: defines the obtained coordinate value as a start point $(x_1, y_1)$ S150: obtains a line category from the outline data S151: shifts to S171 if the contour line is closed by the obtained line, otherwise to S152

S152: shifts to S153 if the line category is a straight line, otherwise to S165

S153: reads an end coordinate (X, Y) of the straight line

S154: defines the coordinate value obtained in S153 as an end point $(x_2, y_2)$ S155: calculates a difference value $\Delta x = x_2 - x_1$ and $\Delta y = y_2 - y_1$ S156: outputs a code corresponding to the line category to the compressed data S157: shifts to S158 if the Δx is smaller than the value A, otherwise to S159

Figure 10E:
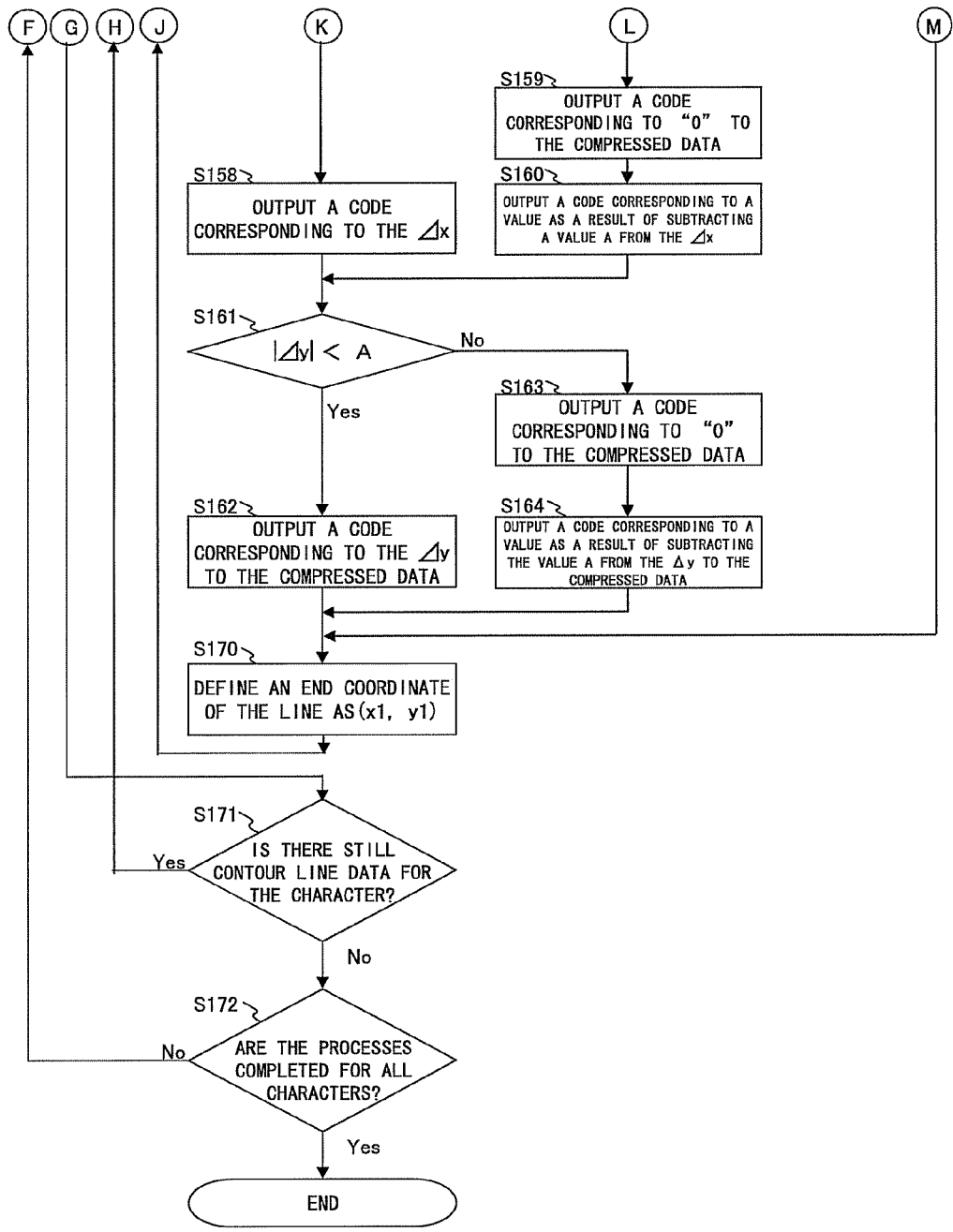
FIG. 10E is a flow chart for describing an operation of an outline font compression system according to the second embodiment of the present invention.

Turning to FIG. 10E hereafter:

S158: outputs a code corresponding to the Δx and shifts to S161

S159: outputs a code corresponding to "0" to the compressed data

S160: outputs a code corresponding to a value as a result of subtracting a value A from the Δx S161: shifts to S162 if the Δy is smaller than the value A, otherwise to S163

S162: outputs a code corresponding to the Δy to the compressed data, and shifts to S170

S163: outputs a code corresponding to "0" to the compressed data

S164: outputs a code corresponding to a value as a result of subtracting the value A from the Δy to the compressed data and shifts to S170

Returning to FIG. 10D:

S165: obtains the coordinate values and parameters necessary for drawing a curve S166: obtains an end coordinate (X, Y) of the curve S167: calculates a difference value related to the curve S168: outputs a code corresponding to a line category to the compressed data S169: outputs a code corresponding to a difference value related to the curve to the compressed data Turning to FIG. 10E again:

S170: defines an end coordinate of the line as $(x_1, y_1)$ and shifts to S150

S171: shifts to S147 if there still is contour line data for the character, otherwise to S172

S172: ends the process if the processes are completed for all characters, otherwise to S146

FIG. 11 is a block diagram showing a brief configuration of an outline font decompression system according to the second embodiment of the present invention. Referring to FIG. 11, the outline font decompression system according to the second embodiment of the present invention comprises a compressed outline font data file 71 for storing font data (including coordinate difference value compressed data, line category compressed data and a code table) compressed by the compression system described above, a compressed outline font data readout unit 72 for reading the compressed outline data file 71, a difference value conversion threshold value readout unit 73 for reading and retaining a difference value conversion threshold value from the compressed outline font data file 71, a line category data decompression unit 74 for decompressing line category data from the readout compressed outline data, a coordinate difference value data decompression unit 75 for decompressing coordinate difference value data from the readout compressed outline data, a line category judgment unit 76 for judging a line category from the line category data, a coordinate difference value conversion unit 77 for applying a coordinate difference value conversion to a difference value of adjacent coordinates as both ends of a straight line in the coordinate difference value data based on the difference value conversion threshold value retained by the difference value conversion threshold value readout unit 73, and a coordinate value calculation unit 78 for calculating and outputting a coordinate value based on difference value data of ones other than both ends of a straight line and converted coordinate difference value data related to both ends of the straight line. The judged and output line category and output coordinate value are input to a figure drawing unit 80 that in turn draws a figure based on the input data.

Figure 12B:
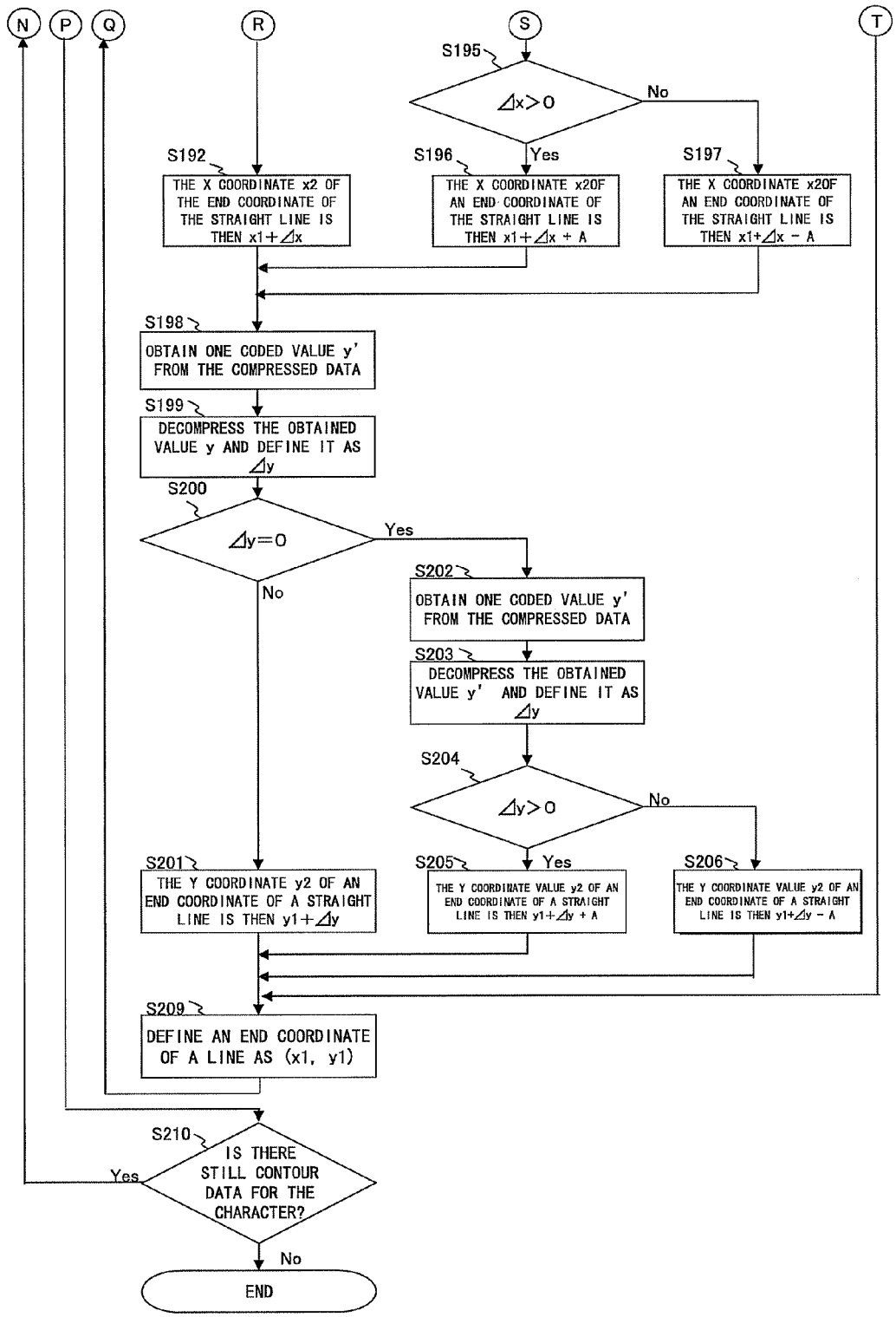
FIG. 12B is a flow chart for describing an operation of an outline font decompression system according to the second embodiment of the present invention.

FIGS. 12A and 12B show flow charts for describing an operation of an outline font decompression system according to the second embodiment of the present invention. First, referring to FIG. 12A:

S181: obtains a header part including such as a table used for decompression from the compressed data S182: obtains a value A from the compressed data S183: obtains the line category and coordinate data for a specified one character from the compressed data S184: obtains a figure drawing start coordinate (X, Y) of a contour line S185: defines the obtained coordinate value as a start point $(x_1, y_1)$ S186: obtains a coded line category from the compressed data S187: shifts to S210 if the contour line is closed by the obtained line, otherwise to S188

S188: shifts to S189 if the line category is a straight line, otherwise to S207

S189: obtains one coded value x' from the compressed data

S190: decompresses the value x' obtained in S189 and defines it as $\Delta x$

S191: shifts to S192 if the $\Delta x$ is "0", otherwise to S193

Turning to FIG. 12B hereafter:

S192: the X coordinate $x_2$ of the end coordinate of the straight line is then $x_1 + \Delta x$. Shifts to S198

Returning to FIG. 12A:

S193: obtains one coded value x' from the compressed data

S194: decompresses the value x' obtained in S193 and defines it as $\Delta x$

Returning to FIG. 12B again:

S195: shifts to S196 if the $\Delta x$ is a positive value, otherwise to S197

S196: the X coordinate $x_2$ of an end coordinate of the straight line is then $x_1 + \Delta x + A$. Shifts to S198

S197: the X coordinate $x_2$ of an end coordinate of the straight line is then $x_1 + \Delta x - A$. Shifts to S198

S198: obtains one coded value y' from the compressed data

S199: decompresses the value y' obtained in S198 and defines it as $\Delta y$

S200: shifts to S201 if the $\Delta y$ is "0", otherwise to S202

S201: the Y coordinate $y_2$ of an end coordinate of a straight line is then $y_1 + \Delta y$, and shifts to S209

S202: obtains one coded value y' from the compressed data

S203: decompresses the value y' obtained in S202 and defines it as $\Delta y$

S204: shifts to S205 if the $\Delta y$ is a positive value, otherwise to S206

S205: the Y coordinate value $y_2$ of an end coordinate of a straight line is then $y_1 + \Delta y + A$. Shifts to S209

S206: the Y coordinate value $y_2$ of an end coordinate of a straight line is then $y_1 + \Delta y - A$. Shifts to S209

Returning to FIG. 12A:

S207: obtains a coded coordinate value and parameter from the compressed data

S208: decompresses the coded coordinate value and parameter obtained in S207

Turning to FIG. 12B again:

S209: defines an end coordinate of a line as $(x_1, y_1)$ and shifts to S186

S210: shifts to S184 if there still is contour data for the character, otherwise the process ends

[Third Embodiment]

FIG. 13 is a configuration diagram of an outline font compression system according to a third embodiment of the present invention. Referring to FIG. 13, the outline font compression system according to the third embodiment of the present invention comprises an outline data file 81 for storing outline font data, an outline font data readout unit 82 for reading line category data and coordinate data from the outline font data, a line category judgment unit 83 for judging a line category from the readout line category data, a line category data statistics obtainment unit 84 for taking statistics on line category data and obtaining line category appearance frequency distribution data, a line category coding unit 85 for performing a line category coding based on the line category appearance distribution data, a coded line category output unit 86 for outputting a coded line category, a coordinate difference value calculation unit 87 for calculating a difference of values of adjacent coordinates from the readout coordinate data, a coordinate difference value statistics obtainment unit 88 for taking statistics on the coordinate difference values and obtaining coordinate difference value appearance frequency distribution data, a coordinate difference value coding unit 89 for obtaining first coordinate difference value appearance frequency distribution data related to a difference value of adjacent coordinates as both ends of a straight line, obtains second coordinate difference value appearance frequency distribution data related to a difference value of adjacent coordinates other than both ends of a straight line (i.e., a curve) and making code tables T1 and T2 by coding coordinate difference values based on these pieces of coordinate difference value appearance frequency distribution data, a coded coordinate difference value output unit 90 for outputting the coded coordinate difference values, and a compressed outline font data file 91 for storing the respectively output coded line category and coded coordinate difference values.

Figure 14B:
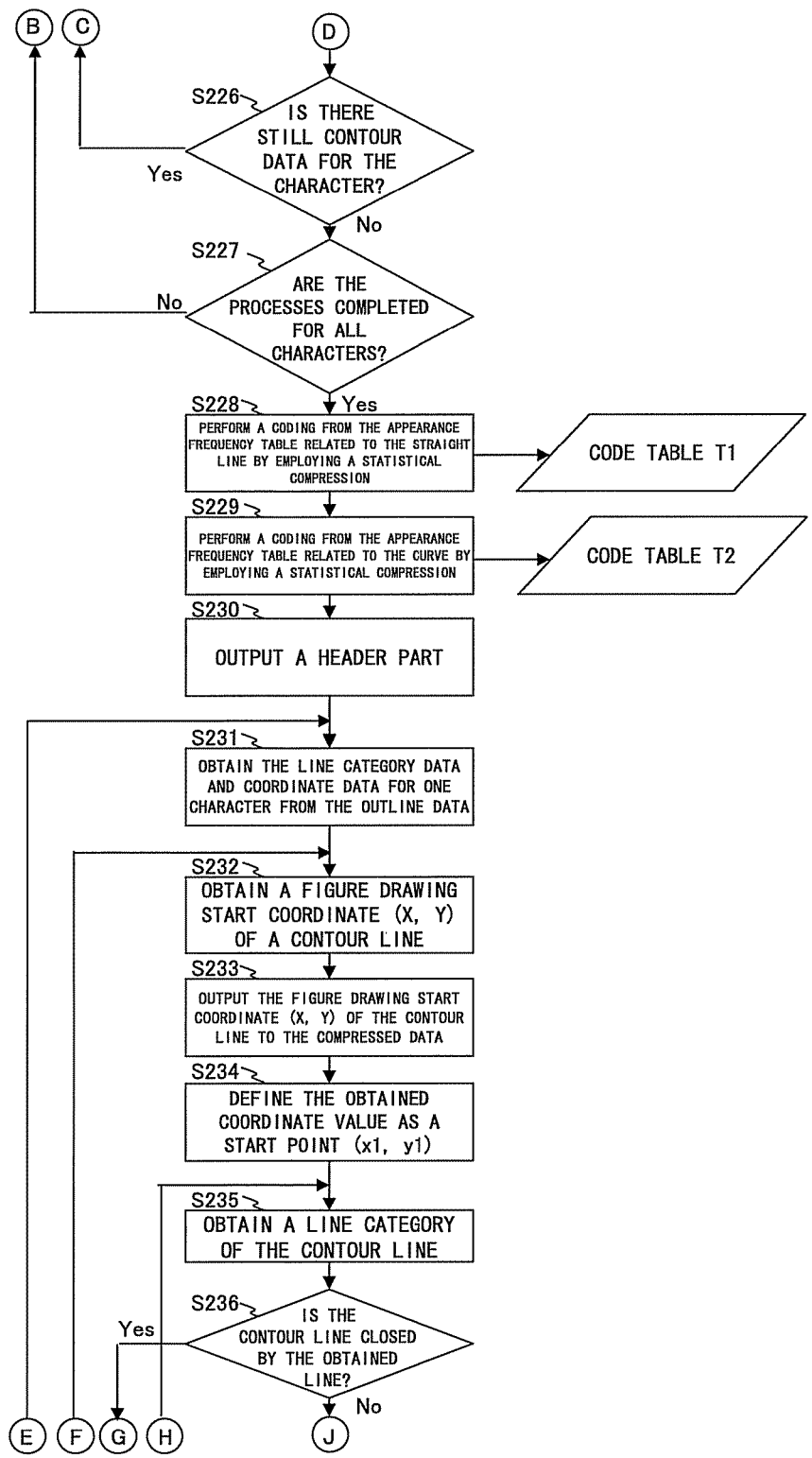
FIG. 14B is a flow chart for describing a n operation of an outline font compression system according to the third embodiment of the present invention.
Figure 14C:
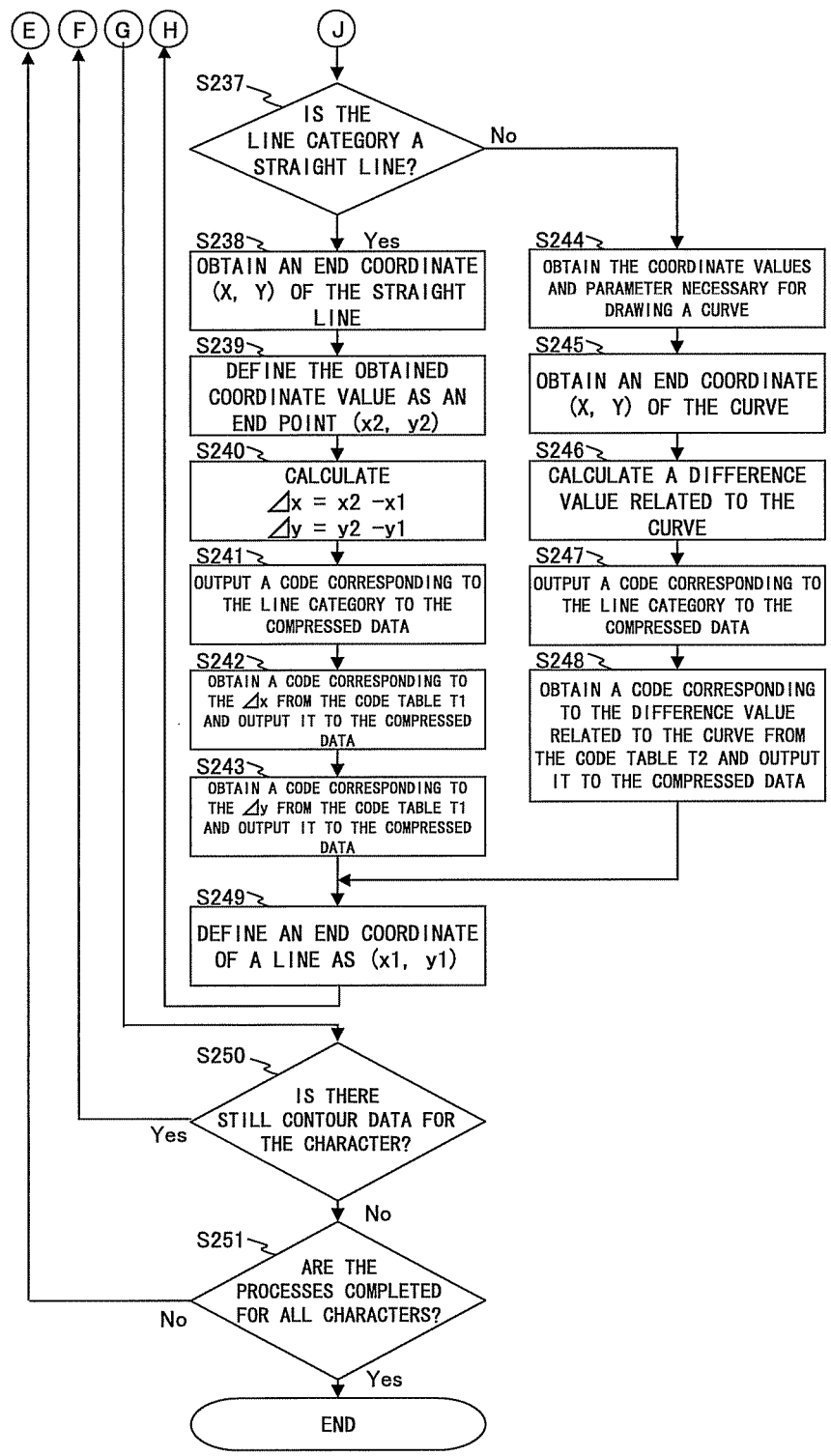
FIG. 14C is a flow chart for describing an operation of an outline font compression system according to the third embodiment of the present invention.

FIGS. 14A through 14C show a flow chart for describing an operation of an outline font compression system according to the third embodiment of the present invention. There are Bezier curve, circular arc and such among lines other than a straight line, while the present invention calls a curve as a representative of them.

The next is a brief description of an operation of the outline font compression system according to the third embodiment of the present invention before proceeding to a description of the flow chart shown by FIGS. 14A through 14C. First step reads line categories of contour lines and coordinate values of the lines from contour line data of each of all characters stored in the outline font data file and calculates difference values of respective adjacent coordinates. The next, referring to an appearance frequency of the difference value of adjacent coordinates as both ends of a straight line for all of them, performs a statistical coding and make a code table T1. The next performs a statistical coding by referring to an appearance frequency for the difference value of coordinate related to a curve that has not been referred to in the above process, and makes a code table T2. The next calculates also an appearance frequency of the line category and performs a statistical coding. The statistically coded data is stored in the compressed outline font file. The post-compression outline font data results in being the line category data and coordinate data of the original outline font data replaced by coded data. The third embodiment of the present invention is configured to retain the two code tables as is without applying a conversion process in the case of a font style for which compression efficiency cannot be improved due to being unable to assimilate the appearance frequency distributions of difference values of adjacent coordinates between the category of a connecting line being a straight line and that of a connecting line being a curve even by applying a conversion process to a difference value as in the case of the first and second embodiment described above. In this case, while having two code tables increases a size of a code table, nonetheless compression efficiency provided by having the two code tables is larger, thereby enabling a reduction of an eventual data size after compression.

The next is a description of the flow chart shown by FIGS. 14A and 14C. First, referring to FIG. 14A:

S211: obtains the line category and coordinates data for one character from the outline data S212: obtains a figure drawing start coordinate (X, Y) of a contour line S213: defines the obtained coordinate value as a start point $(x_1, y_1)$ S214: obtains a line category from the outline data S215: shifts to S226 if the contour line is closed by the obtained line, otherwise to S216

S216: shifts to S217 if the line category is a straight line, otherwise to S221

S217: obtains an end coordinate (X, Y) of the straight line

S218: defines the coordinate value obtained in S217 as an end point $(x_2, y_2)$ S219: calculates a difference value $\Delta x = x_2 - x_1$ and $\Delta y = y_2 - y_1$ S220: registers the $\Delta x$ and $\Delta y$ in an appearance frequency table related to a straight line, and shifts to S225

S221: obtains coordinate values and parameter necessary for drawing a curve

S222: obtains an end coordinate (X, Y) of the curve

S223: calculates a difference value related to the curve

S224: register the difference value in an appearance frequency table related to a curve S225: defines an end coordinate of a line as $(x_1, y_1)$ and shifts to S214

Turning to FIG. 14B hereafter:

S226: shifts to S212 if there still is contour data for the character, otherwise to S227

S227: shifts to S228 if the processes are completed for all characters, otherwise to S211

S228: performs a coding from the appearance frequency table related to the straight line by employing a statistical compression, and makes a code table T1

S229: performs a coding from the appearance frequency table related to the curve by employing a statistical compression, and makes a code table T2

S230: outputs a header part, as compressed data, including the tables T1 and T2 to be used for decompression S231: obtains the line category data and coordinate data for one character from the outline data S232: obtains a figure drawing start coordinate (X, Y) of a contour line S233: outputs the figure drawing start coordinate (X, Y) of the contour line to the compressed data S234: defines the obtained coordinate value as a start point $(x_1, y_1)$ S235: obtains a line category from the outline data S236: shifts to S250 if the contour line is closed by the obtained line, otherwise to S237

Turning to FIG. 14C hereafter:

S237: shifts to S238 if the line category is a straight line, otherwise to S244

S238: obtains an end coordinate (X, Y) of the straight line

S239: defines the coordinate value obtained in S238 as an end point $(x_2, y_2)$ S240: calculates $\Delta x = x_2 - x_1$ and $\Delta y = y_2 - y_1$ S241: outputs a code corresponding to the line category to the compressed data S242: obtains a code corresponding to the $\Delta x$ from the code table T1 and outputs it to the compressed data S243: obtains a code corresponding to the $\Delta y$ from the code table T1 and outputs it to the compressed data. Then shifts to S249

S244: obtains the coordinate values and parameter necessary for drawing a curve

S245: obtains an end coordinate (X, Y) of the curve

S246: calculates a difference value related to the curve

S247: outputs a code corresponding to the line category to the compressed data

S248: obtains a code corresponding to the difference value related to the curve from the code table T2 and outputs it to the compressed data S249: defines an end coordinate of a line as $(x_1, y_1)$ and shifts to S235

S250: shifts to S232 if there still is contour data for the character, otherwise to S251

S251: the process ends if the processes are completed for all characters, otherwise to S231

FIG. 15 is a configuration diagram of an outline font decompression system according to the third embodiment of the present invention. Referring to FIG. 15, the outline font decompression system according to the third embodiment of the present invention comprises a compressed outline font data file 101 for storing font data (including coordinate difference value compressed data, line category compressed data, and code tables T1 and T2) compressed by the above described compression system, a compressed outline font data readout unit 102 for reading compressed outline font data from the compressed outline data file 31, a line category decompression unit 103 for decompressing line category data from the readout compressed outline data, a line category judgment unit 104 for judging a line category from the decompressed line category data, a straight line coordinate difference value data decompression unit 105 for decompressing data of a coordinate difference value related to a straight line from the readout compressed outline data, a curve coordinate difference value data decompression unit 106 for decompressing data of a coordinate difference value related to a curve from the readout compressed outline data, a coordinate value calculation unit 107 for calculating a coordinate value based on the decompressed coordinate difference value data related to a straight line and on the decompressed coordinate difference value data related to a curve and outputs the coordinate value. The judged and output line category and output coordinate value are input to a figure drawing unit 110 that in turn draws a figure based on the input data.

Figure 16A:
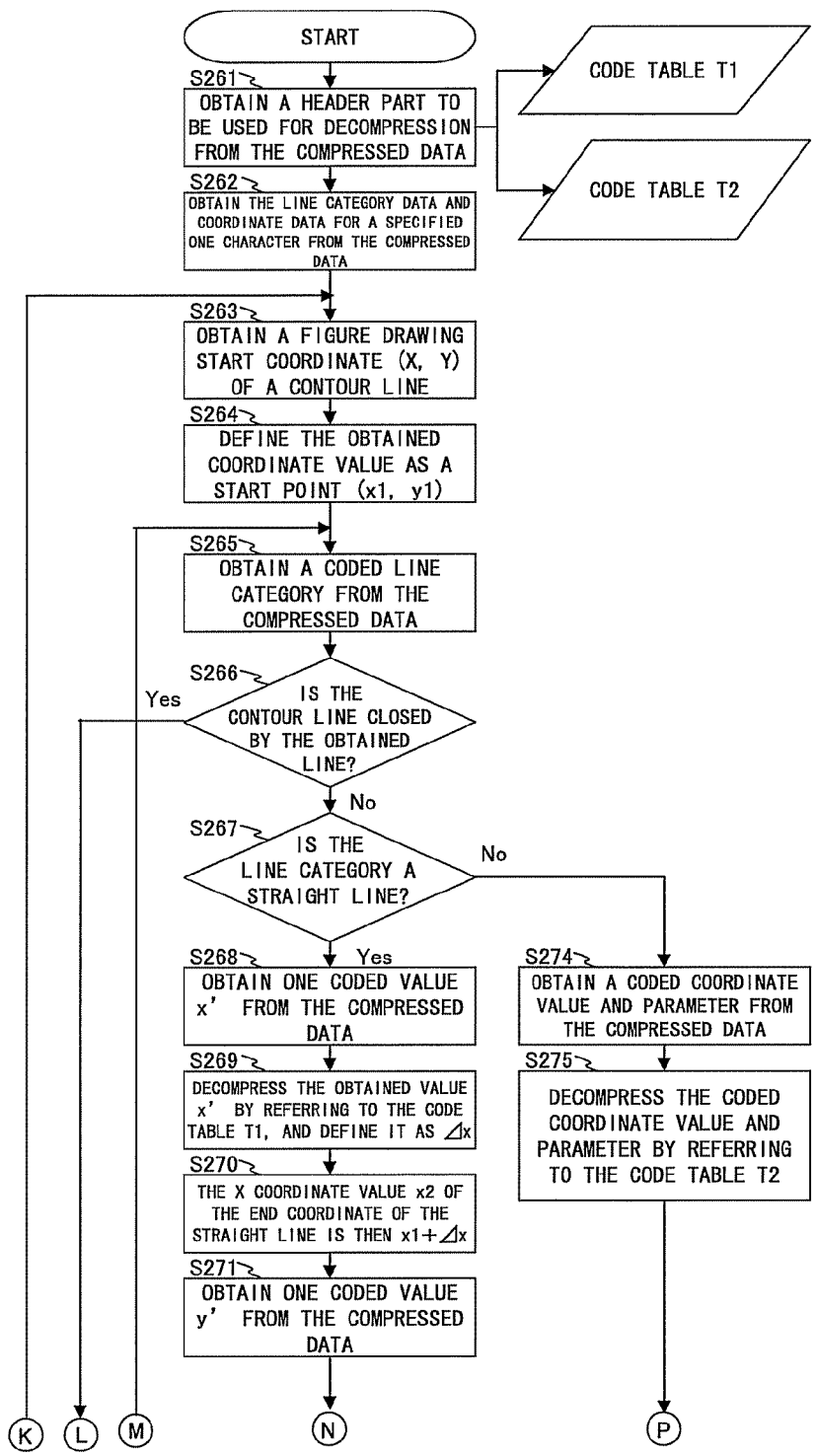
FIG. 16A is a flow chart for describing an operation of an outline font decompression system according to the third embodiment of the present invention.
Figure 16B:
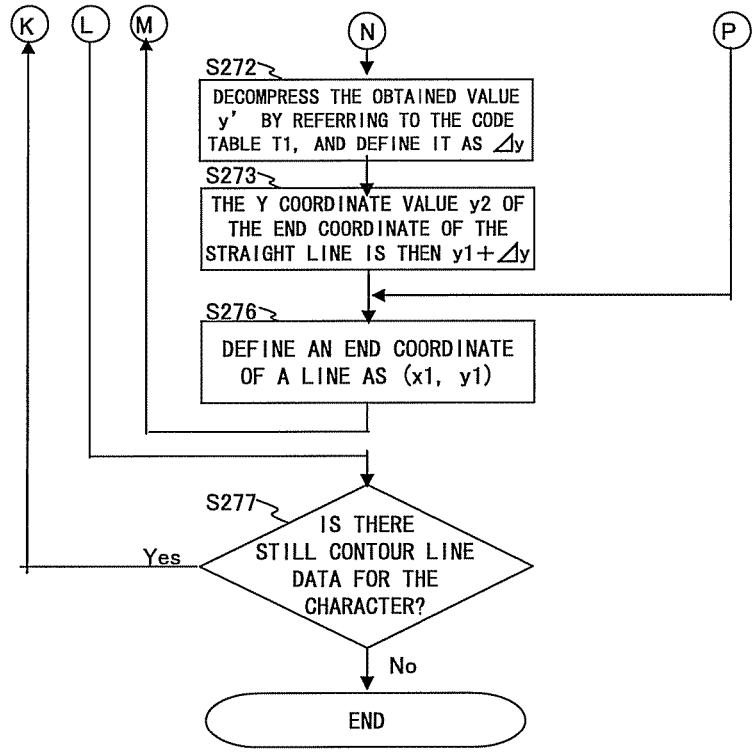
FIG. 16B is a flow chart for describing an operation of an outline font decompression system according to the third embodiment of the present invention.

FIGS. 16A and 16B show flow charts for describing an operation of an outline font decompression system according to the third embodiment of the present invention. First, referring to FIG. 16A:

S261: obtains a header part including such as the tables T1 and T2 to be used for decompression from the compressed data S262: obtains the line category data and coordinate data for a specified one character from the compressed data S263: obtains a figure drawing start coordinate (X, Y) of a contour line S264: defines the obtained coordinate value as a start point $(x_1, y_1)$ S265: obtain a coded line category from the compressed data S266: shifts to S277 if the contour line is closed by the obtained line, otherwise to S267

S267: shifts to S268 if the line category is a straight line, otherwise to S274

S268: obtains one coded value x' from the compressed data

S269: decompresses the value x' obtained in S268 by referring to the code table T1, and defines it as $\Delta x$ S270: the X coordinate value $x_2$ of the end coordinate of the straight line is then $x_1 + \Delta x$ S271: obtains one coded value y' from the compressed data Turning to FIG. 16B hereafter:

S272: decompresses the value y' obtained in S271 by referring to the code table T1, and defines it as $\Delta y$ S273: the Y coordinate value $y_2$ of the end coordinate of the straight line is then $y_1 + \Delta y$ Returning to FIG. 16A:

S274: obtains a coded coordinate value and parameter from the compressed data

S275: decompresses the coded coordinate value and parameter, which are obtained in S274, by referring to the code table T2

Returning to FIG. 16B again:

S276: defines an end coordinate of a line as $(x_1, y_1)$ and shifts to S265

S277: shifts to S263 if there still is contour line data for the character, otherwise the process ends As described above, the outline font data generated by employing the outline font compression method according to the present invention enables incorporation into various kinds of equipment for carrying out a character display and therefore a wide range of utilization. It makes it possible to store an outline font of a large data size that used to cause a memory capacity shortage in a piece of conventional built-in equipment, hence precluding a storage capability, thereby providing a storage capacity for two font types or more in a piece of equipment already storing one font type.

What is claimed is:

1. A non-transitory computer-readable record medium storing a program for a computer to realize an outline font compression method comprising:
   reading outline font data storing (x,y) coordinate values of both ends of a line necessary for drawing a contour of a character and a category of said line connecting a pair of said ends;
   compressing said outline font data;
   calculating a difference of (x,y) coordinate values of both ends of each of lines using the outline font data;
   calculating a threshold value "A" using a frequency of appearance related to said calculated difference values;
   determining, to be a difference value of both ends of each of lines, a value of a result of subtracting said threshold value "A" from a difference of (x,y) coordinate values of both ends of said straight line, if a category of line being a straight line and if the difference of (x,y) coordinate values of both ends of said straight line are greater than said threshold value A;
   taking statistics on the difference of (x,y) coordinate values of both ends and obtaining coordinate difference value appearance frequency distribution data;
   calculating a difference value conversion threshold value using the coordinate difference value appearance frequency distribution data;
   applying a coordinate difference conversion to the difference values as both ends of a straight line;
   recalculating the coordinate difference value appearance frequency distribution data for the straight line to which the coordinate difference conversion is applied and that for other values of both ends;
   obtaining a first difference value appearance frequency distribution of coordinates constituting curves using the recalculated the coordinate difference value appearance frequency distribution data;
   obtaining a second difference value appearance frequency distribution of both ends coordinates of straight lines using the recalculated the coordinate difference value appearance frequency distribution data; and
   performing a coordinate difference value coding using a third difference value appearance frequency distribution of a total of the first difference value appearance frequency distribution and the second difference value appearance frequency distribution.

2. A non-transitory computer-readable record medium according to claim 1 further comprising: determining said threshold value A to be a difference value of the highest frequency of appearance related to difference values of coordinates of which a category of a line connecting the both ends to each other is a straight line, and describing the threshold value A in a certain spot of outline font data storing the difference value.

3. A non-transitory computer-readable record medium storing a program for a computer to realize an outline font decompression method comprising:
   obtaining outline font data from compressed data;
   determining, to be a coordinate value forming a contour, a coordinate value of a result of adding a difference value of decompressed coordinates to one-previous coordinate value if a category of a line is not a straight line;
   adding a value of a result of adding a value, which is a conversion of a difference value of decompressed coordinates into one prior to being subtracted by a threshold value "A", to one-previous coordinate value and determining the resultant value to be a coordinate value forming a contour if a category of a line is a straight line and if a difference value of decompressed coordinates is not "0"; and
   decompressing a difference value of coordinates stored next in order, adding one-previous coordinate value to the difference value and determining the resultant value to be a coordinate value forming a contour if a category of a line is a straight line and if a difference value of decompressed coordinates is "0", and
   said outline font compression method comprises:
   reading outline font data storing (x,y) coordinate values of both ends of a line necessary for drawing a contour of a character and a category of said line connecting a pair of said ends;
   compressing said outline font data;
   calculating a difference of (x,y) coordinate values of both ends of each of lines using the outline font data;
   calculating a threshold value "A" using a frequency of appearance related to said calculated difference values;
   determining, to be a difference value of both ends of each of lines, a value of a result of subtracting said threshold value "A" from a difference of (x,y) coordinate values of both ends of said straight line, if a category of line being a straight line and if the difference of (x,y) values of both ends of said straight line are greater than said threshold value A;
   adding a specific code difference values that are smaller than the threshold value A, in the case of if a category of line being a straight line and if the difference of (x,y) values of both ends of said straight line;
   taking statistics on the difference of (x,y) coordinate values of both ends and obtaining coordinate difference value appearance frequency distribution data;
   calculating a difference value conversion threshold value using the coordinate difference value appearance frequency distribution data;
   applying a coordinate difference conversion to the difference values as both ends of a straight line;
   recalculating the coordinate difference value appearance frequency distribution data for the straight line to which the coordinate difference conversion is applied and that for other values of both ends;
   obtaining a first difference value appearance frequency distribution of coordinates constituting curves using the recalculated the coordinate difference value appearance frequency distribution data;
   obtaining a second difference value appearance frequency distribution of both ends coordinates of straight lines using the recalculated the coordinate difference value appearance frequency distribution data; and performing a coordinate difference value coding using a third difference value appearance frequency distribution of a total of the first difference value appearance frequency distribution and the second difference value appearance frequency distribution.

4. A non-transitory computer-readable record medium storing a program for a computer to realize an outline font compression method comprising:
   reading outline font data storing (x,y) coordinate values of both ends of a line necessary for drawing a contour of a character and a category of said line connecting a pair of said ends;
   compressing said outline font data;
   calculating a difference of (x,y) coordinate values of both ends of each of lines using the outline font data;
   calculating a threshold value "A" using a frequency of appearance related to said calculated difference values;
   adding a specific code to data indicating the difference values, if a category of line being a straight line and if the difference of (x,y) coordinate values of both ends of said straight line are not greater than said threshold value A;
   taking statistics on the difference of (x,y) coordinate values of both ends and obtaining coordinate difference value appearance frequency distribution data;
   calculating a difference value conversion threshold value using the coordinate difference value appearance frequency distribution data;
   applying a coordinate difference conversion to the difference values as both ends of a straight line;
   recalculating the coordinate difference value appearance frequency distribution data for the straight line to which the coordinate difference conversion is applied and that for other values of both ends;
   obtaining a first difference value appearance frequency distribution of coordinates constituting curves using the recalculated the coordinate difference value appearance frequency distribution data;
   obtaining a second difference value appearance frequency distribution of both ends coordinates of straight lines using the recalculated the coordinate difference value appearance frequency distribution data; and
   performing a coordinate difference value coding using a third difference value appearance frequency distribution of a total of the first difference value appearance frequency distribution and the second difference value appearance frequency distribution.

5. A non-transitory computer-readable record medium according to claim 4, wherein said threshold value A is determined by a condition of a code length as a result of adding a code length of the specific code to a code length corresponding to a value that is a result of subtracting a value A from a value X exceeding the threshold value A being smaller than a code length corresponding to a value X before subtracting the value threshold A therefrom, and describing the value threshold A in a certain spot of outline font data.

6. A non-transitory computer-readable record medium storing a program for a computer to realize an outline font decompression method comprising:
   obtaining outline font data from compressed data;
   determining, to be a coordinate value forming a contour, a coordinate value of a result of adding a difference value of a decompressed coordinate to one-previous coordinate value if a category of a line is not a straight line;
   determining, to be a coordinate value forming a contour, a result of adding a difference value of a decompressed coordinate to one-previous coordinate value if a category of a line is a straight line and if a difference value of decompressed coordinates is not "0"; and
   adding one-previous coordinate value to a value converted into a value before being subtracted by a threshold value "A" by decompressing a difference value of coordinates stored next in order and determining the resultant value to be a coordinate value forming a contour if a category of a line is a straight line and if a difference value of decompressed coordinates is "0", and
   said outline font compression method comprises:
   reading outline font data storing (x,y) coordinate values of both ends of a line necessary for drawing a contour of a character and a category of said line connecting a pair of said ends;
   compressing said outline font data;
   calculating a difference of (x,y) coordinate values of both ends of each of lines using the outline font data;
   calculating a threshold value "A" using a frequency of appearance related to said calculated difference values;
   determining, to be a difference value of both ends of each of lines, a value of a result of subtracting said threshold value "A" from a difference of (x,y) coordinate values of both ends of said straight line, if a category of line being a straight line and if the difference of (x,y) coordinate values of both ends of said straight line are greater than said threshold value A;
   adding a specific code difference values that are smaller than the threshold value A, in the case of if a category of line being a straight line and if the difference of (x,y) coordinate values of both ends of said straight line;
   taking statistics on the difference of (x,y) coordinate values of both ends and obtaining coordinate difference value appearance frequency distribution data;
   calculating a difference value conversion threshold value using the coordinate difference value appearance frequency distribution data;
   applying a coordinate difference conversion to the difference values as both ends of a straight line;
   recalculating the coordinate difference value appearance frequency distribution data for the straight line to which the coordinate difference conversion is applied and that for other values of both ends;
   obtaining a first difference value appearance frequency distribution of coordinates constituting curves using the recalculated the coordinate difference value appearance frequency distribution data;
   obtaining a second difference value appearance frequency distribution of both ends coordinates of straight lines using the recalculated the coordinate difference value appearance frequency distribution data; and
   performing a coordinate difference value coding using a third difference value appearance frequency distribution of a total of the first difference value appearance frequency distribution and the second difference value appearance frequency distribution.

7. A non-transitory computer-readable record medium storing a program for a computer to realize an outline font compression method comprising:
   reading outline font data storing (x,y) coordinate values of both ends of a line necessary for drawing a contour of a character and a category of said line connecting a pair of said ends;
   compressing said outline font data;
   making a first code table in the case of a category of a line connecting a pair of both ends of the line being a straight line and a second code table in the case of a category of a line connecting a pair of both ends of the line being a curve, and retaining these code tables in font data;

calculating a difference of (x,y) coordinate values of both ends using the outline font data;

taking statistics on the difference of (x,y) coordinate values of both ends and obtaining coordinate difference value appearance frequency distribution data;

calculating a difference value conversion threshold value using the coordinate difference value appearance frequency distribution data;

applying a coordinate difference conversion to the difference values as both ends of a straight line;

recalculating the coordinate difference value appearance frequency distribution data for the straight line to which the coordinate difference conversion is applied and that for other values of both ends;

obtaining a first difference value appearance frequency distribution of coordinates constituting curves using the recalculated the coordinate difference value appearance frequency distribution data;

obtaining a second difference value appearance frequency distribution of both ends coordinates of straight lines using the recalculated the coordinate difference value appearance frequency distribution data; and performing a coordinate difference value coding using a third difference value appearance frequency distribution of a total of the first difference value appearance frequency distribution and the second difference value appearance frequency distribution.

8. A non-transitory computer-readable record medium storing a program for a computer to realize an outline font decompression method comprising:

obtaining outline font data from compressed data;

determining, to be a coordinate value forming a contour, a value as a result of adding a difference value of coordinates decompressed by using said first code table to one-previous coordinate value if a category of a line is a straight line; and determining, to be a coordinate value forming a contour, a value as a result of adding a difference value of coordinates decompressed by using said second code table to one-previous coordinate value if a category of a line is not a straight line, and said outline font compression method comprises:

reading outline font data storing (x,y) coordinate values of both ends of a line necessary for drawing a contour of a character and a category of said line connecting a pair of said ends;

compressing said outline font data;

making a first code table in the case of a category of a line connecting a pair of both ends of the line being a straight line and a second code table in the case of a category of a line connecting a pair of both ends of the line being the other than the straight line, and retaining these code tables in font data;

calculating a difference of (x,y) coordinate values of both ends using the outline font data;

taking statistics on the difference of (x,y) coordinate values of both ends and obtaining coordinate difference value appearance frequency distribution data;

calculating a difference value conversion threshold value using the coordinate difference value appearance frequency distribution data;

applying a coordinate difference conversion to the difference values as both ends of a straight line;

recalculating the coordinate difference value appearance frequency distribution data for the straight line to which the coordinate difference conversion is applied and that for other values of both ends;

obtaining a first difference value appearance frequency distribution of coordinates constituting curves using the recalculated the coordinate difference value appearance frequency distribution data;

obtaining a second difference value appearance frequency distribution of both ends coordinates of straight lines using the recalculated the coordinate difference value appearance frequency distribution data; and performing a coordinate difference value coding using a third difference value appearance frequency distribution of a total of the first difference value appearance frequency distribution and the second difference value appearance frequency distribution.

* * * * *